US011151509B1

(12) United States Patent
Mishra

(10) Patent No.: US 11,151,509 B1
(45) Date of Patent: Oct. 19, 2021

(54) IMAGE-BASED SCENE ATTRIBUTE AND DELIVERY ATTRIBUTE DETERMINATION

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1130 days.

(21) Appl. No.: 15/187,679

(22) Filed: Jun. 20, 2016

(51) Int. Cl.
  *G06Q 10/08* (2012.01)

(52) U.S. Cl.
  CPC ..... *G06Q 10/0833* (2013.01); *G06Q 10/0836* (2013.01); *G06Q 10/08355* (2013.01)

(58) Field of Classification Search
  CPC ............. G06Q 10/083; G06Q 10/0833; G06Q 10/0836; G06Q 10/08355
  See application file for complete search history.

(56) References Cited

U.S. PATENT DOCUMENTS

| 2010/0310182 | A1* | 12/2010 | Kroepfl | G06K 9/00624 382/216 |
| 2015/0254611 | A1* | 9/2015 | Perez | G06Q 10/08355 705/5 |
| 2015/0302495 | A1* | 10/2015 | Stuckman | G01S 1/00 705/26.35 |
| 2015/0348282 | A1* | 12/2015 | Gibbon | G06Q 10/06315 382/103 |
| 2016/0163197 | A1* | 6/2016 | Levy | G08G 1/147 340/932.2 |
| 2017/0011343 | A1* | 1/2017 | Stenneth | B25J 9/163 |
| 2018/0121875 | A1* | 5/2018 | Satyanarayana Rao | G06Q 10/08355 |
| 2020/0394605 | A1* | 12/2020 | Daley | G06Q 10/0833 |

OTHER PUBLICATIONS

Leavitt Group, "Foiling Package Theft", Leavitt Group, Dec. 17, 2015, https://news.leavitt.com/your-life/foiling-package-theft/ (Year: 2015).*

* cited by examiner

*Primary Examiner* — Kevin H Flynn
*Assistant Examiner* — Ismail A Manejwala
(74) *Attorney, Agent, or Firm* — Lee & Hayes, P.C.

(57) ABSTRACT

Images that depict delivery locations associated with a customer may be captured or obtained. One or more classifiers may be utilized to detect and/or identify scene attributes that are depicted in the images and that are associated with the delivery location. One or more correlations between the scene attributes and delivery attributes associated with the delivery location may be determined and used to generate one or more scores for the delivery location. The correlation(s) and/or the score(s) may be utilized to determine delivery instructions that facilitate the delivery of items and/or packages to the delivery location.

20 Claims, 9 Drawing Sheets

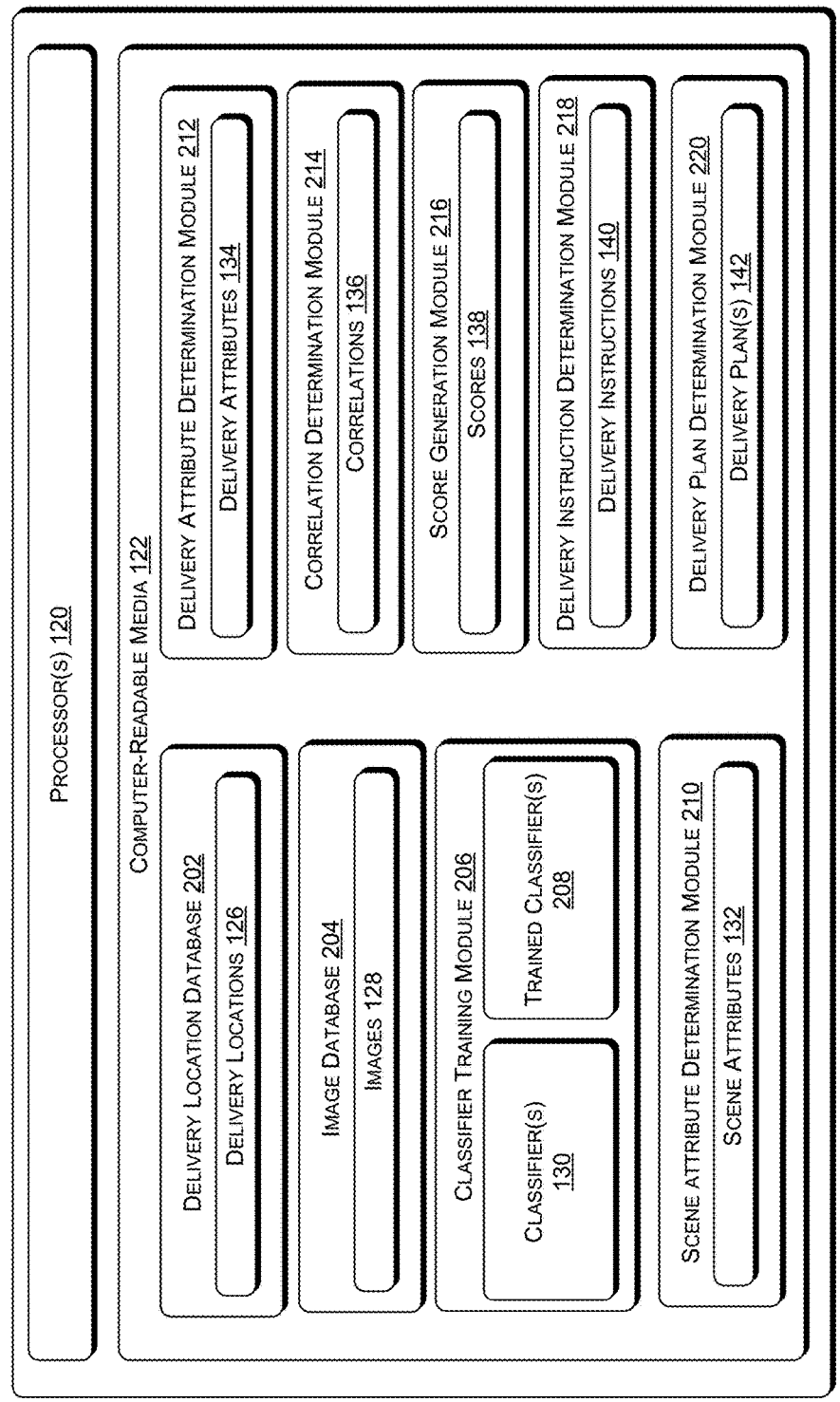
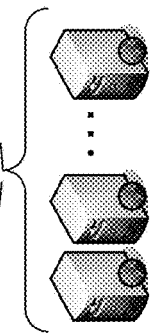
FIG. 2

IMAGE-BASED SCENE ATTRIBUTE AND DELIVERY ATTRIBUTE DETERMINATION

BACKGROUND

With the increase of customers placing online orders for the delivery of items (e.g., products), the number of packages delivered to customers continues to increase. This results in the potential of additional packages being delivered and subsequently stolen, as well as packages being delivered to incorrect addresses. In other instances, a deliverer that is to deliver an item/package to a delivery location (e.g., a residence, a workplace, etc.) of a customer that placed an order for the item may be unable to locate the delivery location, possibly due to poor signage, foliage obscuring the delivery location, and so on. Moreover, the deliverer may be unable to access the delivery location. For instance, a fence, locked gate/door, or an aggressive pet may cause the deliverer to be unable to access an area of the delivery location in which the package is to be delivered. This may result in a poor experience for the customer and increased costs for the deliverer and the entity in which the items were ordered.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 illustrates an example content server that enables the determination of correlations between scene attributes and delivery attributes associated with delivery locations.

DETAILED DESCRIPTION

Figure 1:
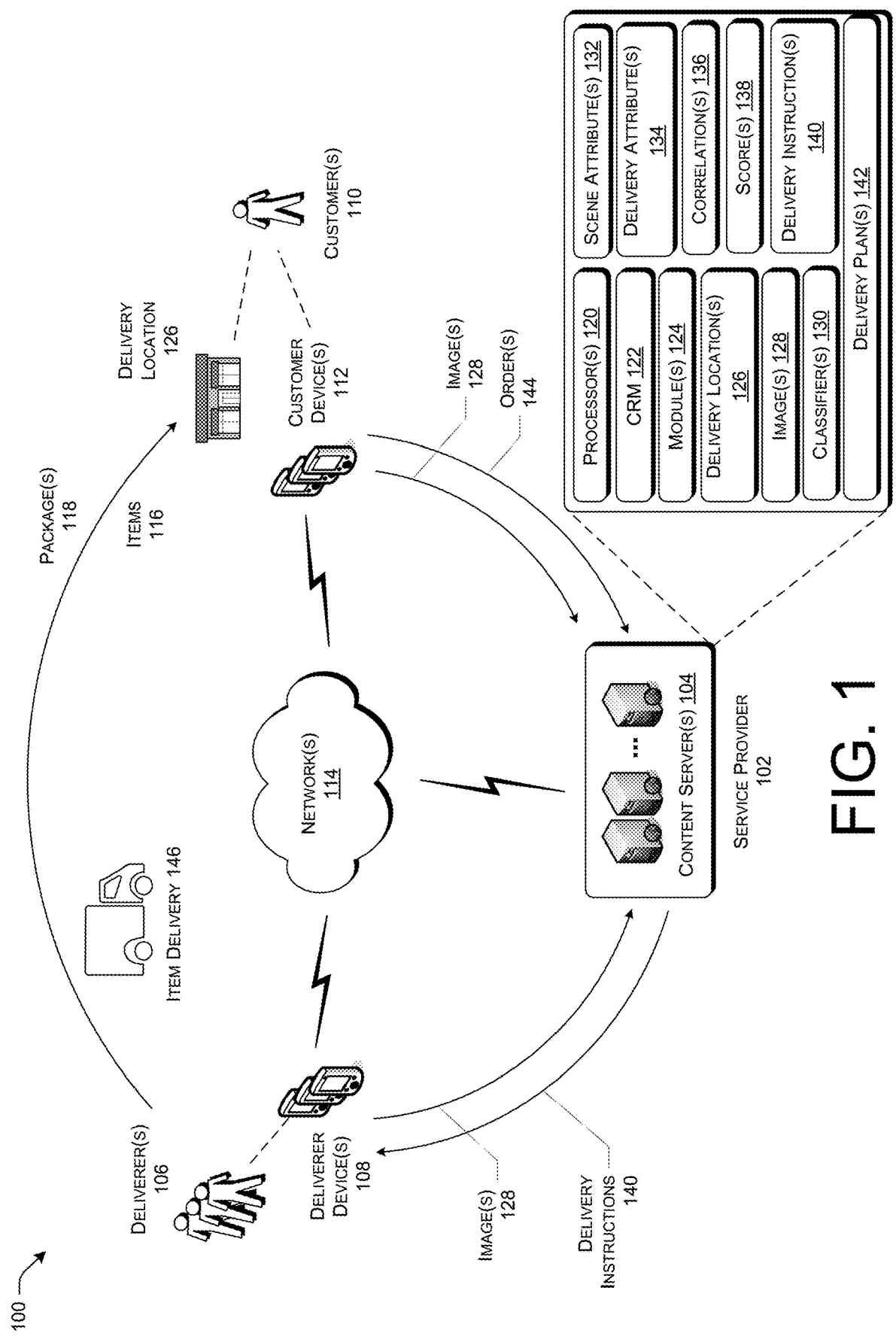
FIG. 1 illustrates an example system for determining correlations between scene attributes and delivery attributes associated with delivery locations.

Described herein are systems and/or processes for determining correlations between scene attributes determined from one or more images of a delivery location and delivery attributes associated with that delivery location. In some embodiments, one or more images of a delivery location (e.g., a location in which an item/package is to be delivered) and/or its surroundings may be captured/obtained/received. Using one or more classifiers, the image(s) may be analyzed to determine scene attributes associated with the delivery location. For instance, the scene attributes may correspond to windows, signage, graffiti, a door, a driveway, a vehicle, foliage, a fence, etc. that are depicted in the image(s) of the delivery location. Delivery attributes relating to prior deliveries to that delivery location may also be determined. Such delivery attributes may correspond to instances in which packages were delivered but not received, an inability of a deliverer to locate or access the delivery location, average parking/delivery times, and so on. The systems and/or processes described herein may determine one or more correlations between the scene attributes and the delivery attributes of the delivery location, and possibly generate one or more scores based on the correlation(s). The correlation(s) and/or score(s) may be used to determine delivery instructions that are to be provided to a deliverer that is to deliver the item(s)/package(s) to a customer corresponding to the delivery location.

In some embodiments, there may be little to no information known about a delivery location associated with a customer that placed an order for an item for delivery. Upon receiving one or more images that depict the delivery location (and possibly its surroundings), possibly from the customer and/or a deliverer, the systems and/or processes described herein may determine, from the image(s), scene attributes associated with the delivery location. Based on previously determined correlations between scene attributes and delivery attributes associated with different delivery locations, the systems and/or processes described herein may predict delivery attributes associated with the delivery location. For instance, it may be determined that the scene attributes are indicative or predictive of a higher/lower risk of delivered but not received (e.g., stolen) packages, or a higher/lower risk of a deliverer being unable to locate or access the delivery location. Based on this information, appropriate delivery instructions may be provided to the deliverer that is to deliver the item/package.

Accordingly, the visual appearance of attributes of a delivery location, which may include its surroundings (e.g., the neighborhood), may indicate the likelihood of a package being delivered and received by a customer. In some instances, the visual appearance of a delivery location may prompt a deliverer to ask whether a package should be delivered and left unattended or to request additional information regarding the delivery. The systems and/or processes described herein are directed to an objective way of assessing whether a package should be delivered based on images that depict the delivery location, without requiring the deliverer to make a subjective decision. That is, the visual appearance of a delivery location or neighborhood (e.g., buildings with signs of neglect, poor signage, poor lighting, poor visibility, lack of parking, etc.) may allow the systems and/or processes described herein to correlate the visual appearance with certain delivery defects (e.g., delivered but not received packages, inability to locate/access delivery locations, etc.).

FIG. 1 illustrates an example system 100 for determining correlations between scene attributes and delivery attributes of a delivery location and possibly determine/provide delivery instructions with respect to that delivery location based on the correlations. As shown in FIG. 1, the system 100 may include a service provider 102, one or more content server(s) 104 associated with the service provider 102, one or more deliverers 106, deliverer devices 108 associated with the deliverers 106, one or more customers 110, and customer devices 112 associated with the customers 110. The service provider 102/content server(s) 104, the deliverer devices 108, and/or the customer devices 112 may communicate via one or more networks 114.

In various embodiments, the service provider 102 may offer items 116 (e.g., products, services, etc.) to customers 110 via an electronic marketplace (e.g., a website, a mobile application, etc.) associated with the service provider 102. That is, the customers 110 may access the electronic marketplace via corresponding customer devices 112 for the purpose of searching for, viewing, selecting, acquiring (e.g., purchasing, leasing, renting, borrowing, lending, etc.), etc., items 116. The items 116 may be provided directly by the service provider 102, or may be provided by the service provider 102 on behalf of a different entity, such as a merchant. That is, via a website, an electronic marketplace, and/or a mobile application associated with the service provider 102, the customers 110 may place orders for items 116 to be provided by the merchants. Alternatively, customers 110 may place orders directly with the merchants, such as via a merchant website, a mobile application associated with a merchant, etc. Upon placing an order for an item 116, the item 116 may be placed in a package 118, and the item 116/package 118 may be physically delivered to a location (e.g., a residence, workplace, etc.) of the customer 110 by one of the deliverers 106.

For the purposes of this discussion, a deliverer 106 may be one or more individuals, an entity, a device (e.g., unmanned aerial vehicle (UAV)), delivery vehicle, etc., that delivers the ordered item 116 or a package 118 that contains the ordered item 116 to a physical location associated with a customer 110 that placed the order. Provided that the deliverer 106 is an individual, the deliverer 106 may be associated with the service provider 102 (e.g., a delivery associate that is employed by the service provider 102), a merchant, or a different third party. The deliverer 106 may also have a deliverer device 108 (e.g., a cellular telephone, a tablet device, a laptop computer, a camera, etc.) that is used to by the deliverer 106 to receive information regarding the delivery of items 116/packages 118, and/or to capture visual data (e.g., images, videos, etc.) of delivery locations. Moreover, the items 116/packages 118 may be transported and delivered in any manner, such as on foot (e.g., walking), using a bicycle, a delivery vehicle (e.g., car, motorcycle, truck, etc.), a UAV, etc.

Moreover, the customers 110 may include any person or entity that interacts with the service provider 102 for the purpose of ordering, acquiring, purchasing, etc., items 116 from the service provider 102, possibly on behalf of the merchants. The customers 110 may include in-store customers 110 that purchase or consume the items 116 provided by the service provider 102/merchants at the current physical location of the service provider 102/merchants, and remote customers 110 that also order items 116 from the service provider 102/merchants, but that either pick up the items 116 from the current physical location of the service provider 102/merchants or have the items 116 be delivered to a physical location associated with the customers 110. The customers 110 may interact with the service provider 102 and/or the merchants via corresponding customer devices 112, which may include cellular telephones, tablet devices, laptop computers, desktop computers, gaming consoles, electronic book (eBook) reader devices, and so on. The customer devices 112 may also include a camera that may be used by the customer 110 to capture images or video of delivery locations associated with the customer.

The network(s) 114 may facilitate communications and/or interactions between the content server(s) 104 of the service provider 102, the deliverer devices 108, and/or the customer devices 112. The network(s) 114 may facilitate such communications/interactions via any type of network, such as a public wide-area-network (WAN) (e.g., the Internet), which may utilize various different technologies including wired and wireless technologies. Moreover, the content servers 104 may contain any number of servers that are possibly arranged as a server farm. Other server architectures may also be used to implement the content servers 104.

Moreover, content server(s) 104, the deliverer device(s) 108, and/or the customer device(s) 112 may include one or more processors 120 and computer-readable media 122, which is indicated in FIG. 1 as "CRM." The processor(s) 120 may execute one or more modules 124 and/or processes to cause the content server(s) 104, the deliverer device(s) 108, and/or the customer device(s) 112 to perform a variety of functions, as set forth above and explained in further detail in the following disclosure. In some embodiments, the processor(s) 120 may include a central processing unit (CPU), a graphics processing unit (GPU), both CPU and GPU, or other processing units or components known in the art. Additionally, each of the processor(s) 120 may possess its own local memory, which also may store program modules, program data, and/or one or more operating systems.

The computer-readable media 122 may include volatile memory (such as RAM), non-volatile memory (such as ROM, flash memory, miniature hard drive, memory card, or the like), or some combination thereof. The computer-readable media 122 may be non-transitory computer-readable media 122. The computer-readable media 122 may include or be associated with the one or more modules 124 that perform various operations associated with the content server(s) 104. In some embodiments, the one or more modules 124 may include or be associated with computer-executable instructions that are stored by the computer-readable media 122 and that are executable by the processor(s) 120 to perform such operations. The content server(s) 104, the deliverer device(s) 108, and/or the customer device(s) 112 may also include additional components not listed above that may perform any function associated with the content server(s) 104, the deliverer device(s) 108, and/or the customer device(s) 112.

As shown in FIG. 1, the content server(s) 104 may receive, obtain, determine, store, etc., various types of information, such as delivery locations 126 associated with the customers 110, images 128 that depict the delivery locations 126, classifiers 130 that are used to identify or determine scene attributes 132 of the delivery locations 126 that are depicted in the images 128, delivery attributes 134 associated with the delivery locations 126, correlations 136 between the scene attributes 132 and the delivery attributes 134 with respect to the delivery locations 126, scores 138 that are generated based on the correlations 136, and delivery instructions 140 for items 116/packages 118 that are to be delivered to the delivery locations 126 and that are provided to the deliverers 106.

As shown in FIG. 1, the customer 110, and other customers 110, may each be associated with one or more delivery locations 126, which may correspond to a physical location in which items 116/packages 118 are to be delivered. For instance, a delivery location 126 may correspond to a residence (e.g., a single family residence, an apartment building, a mailbox, etc.), a place of employment, a P.O. box, and so on. The service provider 102 may associate delivery locations 126 with user profiles and/or user accounts of customers 110. Moreover, the images 128 may depict various delivery locations 126 of the customers 110. For example, provided that a delivery location 126 is a home of a customer 110, one or more images 128 may depict the home of the customer 110, as well as the surroundings (e.g., a yard, a neighborhood, a neighbor's house, a street/sidewalk, etc.). As will be discussed in additional detail herein, the images 128 may be captured by the customer 110, one or more deliverers 106, a camera associated with a vehicle, such as a delivery vehicle, etc. and provided to the service provider 102. Moreover, for the purposes of this discussion, the term "visual data" may include both images (e.g., still images, panoramic images, etc.) and video data (e.g., videos, panoramic videos, etc.).

The service provider 102 may generate, use, or otherwise be associated with one or more classifiers 130 that are used to determine/detect scene attributes 132 associated with the delivery locations 126. The classifiers 130 may also be trained using one or more machine learning techniques, such as a supervised learning, where the classifiers 130 may be trained using the images 128 (e.g., the training data/set). In various embodiments, the scene attributes 132 of a delivery location 126 may be detected from one or more images 128 that depict the delivery location 126. For example, in some instances, the scene attributes 132 may correspond to a door, windows, a driveway, a vehicle, foliage, streetlights, a fence, a gate, graffiti, signage, and any other features or attributes that are visually depicted in the image 128. Moreover, in some embodiments, the service provider 102 may generate or assign confidence values for the scene attributes 132, where the confidence values indicate a likelihood that a particular scene attribute 132 is in fact that particular scene attribute 132. That is, the confidence value for a window detected/identified in the image 128 may indicate a likelihood that the detected/identified window has been correctly identified.

The service provider 102 may also determine and/or store delivery attributes 134 for different delivery locations 126. The delivery attributes 134 for a particular delivery location 126 may correspond to prior deliveries to that delivery location 126. More particularly, the delivery attributes 134 may indicate instances of successful deliveries of items 116/packages 118, instances of times in which items 116/packages 118 were delivered but not received by the customer 110, instances of times in which a deliverer 106 was unable to locate and/or access a delivery location 126, an average parking time, an average delivery time, and so on. Accordingly, the delivery attributes 134 for a delivery location 126 may indicate the difficulty associated with locating and delivering items 116/packages 118 to that delivery location 126.

In certain embodiments, and with respect to one or more delivery locations 126, the service provider 102 may determine one or more correlations 136 between the scene attributes 132 and the delivery attributes 134 for the one or more delivery locations 126. The correlations 136 may indicate that certain scene attributes 132 (e.g., a number of windows, a fence, etc.) of a delivery location 126 are indicative or predictive of a particular delivery outcome. Such delivery outcomes may include a successful delivery to the customer 110, the deliverer 106 being unable to locate and/or access the delivery location 126, the item 116/package 118 being delivered but not received by the customer 110 (e.g., a stolen package), the deliverer 106 having difficulty parking at the delivery location 126 (e.g., higher than average parking time), a higher than average delivery time, and so on. In some instances, the service provider 102 may have little or no information regarding a specific delivery location 126. For instance, the service provider 102 may not have previously delivered items 116 to that delivery location 126, which may result in a lack of delivery attributes 134 associated with that delivery location 126. In these instances, the service provider 102 may determine/identify scene attributes 132 of the delivery location 126 based on one or more images 128 that depict that delivery location 126. The service provider 102 may leverage correlations 136 relating to other delivery locations 126 in order predict/infer delivery attributes 134 (likely delivery outcomes) for that delivery location 126.

Based on the scene attributes 132, the delivery attributes 134, and/or the correlations 136 for a delivery location 126, the service provider 102 may generate one or more scores 138 for the delivery location 126. For instance, the scores 138 may represent an ease or difficulty of delivering items 116/packages 118 to that delivery location 126. For instance, the scores 138 may be a numerical value that indicates the risk or likelihood of an occurrence of a delivery attribute 134 or a delivery defect, such as an item 116/package 118 not being received, not being delivered, the difficulty in parking at the delivery location 126, or a difficulty in delivering the item 116/package 118.

Moreover, based on the correlations 136 and/or scores 138, the service provider 102 may determine one or more delivery instructions 140 with respect to delivering items 116/packages 118 to a particular delivery location 126. Upon a customer 110 placing an order 144 for one or more items 116 for delivery, the service provider 102 may provide, to a deliverer device 108 of a deliverer 106 that is to deliver the item(s) 116, the delivery instructions 140 that correspond to a delivery location 126 (e.g., a residence, workplace, etc.) of the customer 110. For instance, the delivery instructions 140 may indicate that the deliverer 106 should park at the first available parking spot, or should confirm the delivery location 126 upon delivering the item 116/package 118 due to poor signage (e.g., no street signs, no address numbers on a house). Based on the delivery instructions 140, the deliverer 106 may physically transport the ordered items 116 to the delivery location 126 of the customer 110 (i.e., item delivery 146). That way, the likelihood that the deliverer 106 will need assistance in completing the delivery (e.g., calling/texting a call center for instructions) may be significantly decreased.

Based at least partly on the scene attributes 132, the delivery attributes 134, the correlations 136, and/or the scores 138, the service provider 102 may generate or determine one or more delivery plans 142 and/or delivery routes. As will be discussed in additional detail with respect to FIG. 2, the delivery plan(s) 142 may relate to plans and/or routes by which items 116/packages 118 are to be delivered to customers 110 at corresponding delivery locations 126.

FIG. 2 illustrates an example system 200 that depicts the content server(s) 104 illustrated in FIG. 1. As shown, the content server(s) 104 includes the one or more processor(s) 120, the computer-readable media 122, and various modules 124. Although specific modules 124 are illustrated in FIG. 2, the content server(s) 104 may store any number or type of modules 124.

As shown, the computer-readable media 122 may include, store, or otherwise be associated with a delivery location database 202, which may store delivery locations 126 associated with different customers 110 (e.g., individuals, groups of individuals, etc.) or entities (e.g., businesses, corporations, schools, nonprofits, etc.). In various embodiments, a customer 110 may be associated with one or more delivery locations 126 in which items 116/packages 118 are delivered to the customer 110 by deliverers 106 that may or may not be associated with the service provider 102. The delivery locations 126 may correspond to a residence, a workplace, etc., and may be provided by the customer 110, or determined by the service provider 102. Moreover, a delivery location 126 may include one or more delivery points, which may correspond to specific locations at the delivery location 126 (e.g., a mudroom, a side door, a porch, a back patio, etc.) in which items 116/packages 118 should be delivered.

The computer-readable media 122 may also include, store, or otherwise be associated with an image database 204, which stores one or more images 128 and/or videos that depict different delivery locations 126 and/or delivery points associated with the delivery locations 126. The images 128 may be geo-tagged or geo-referenced such that the images 128 are associated with a specific geographic location, and the images 128 depict content at that particular geographic location.

The images 128 may be captured, received, obtained, etc., in many different ways. For instance, using a customer device 112 (e.g., a cellular telephone, a camera, etc.), a customer 110 may capture one or more images 128 (e.g., still images, panoramic images, etc.) and/or videos that depict a delivery location 126 (e.g., a house, apartment building, business, mailbox, mailroom, etc.) associated therewith. The customer 110 may then provide those images 128 to the service provider 102, such as via an e-mail message, a text message, an application and/or website associated with the service provider 102, and so on. The images 128 may also be captured by one or more deliverers 106 that deliver items 116/packages 118 to the delivery location 126. For instance, a deliverer 106 may capture images 128 that depict the delivery location 126 using his/her deliverer device 108 or a device being worn by the deliverer 106 (e.g., a wearable device, a body camera, etc.). The images 128 may also be captured by a camera associated with a vehicle of the deliverer 106, such as a dashboard camera or a vehicle-mounted camera, which may be a camera that is affixed to the exterior of the vehicle (e.g., the roof, the front/rear of the vehicle, etc.). In some embodiments, the images 128 may be obtained from a service that captures street-based images 128 using one or more autonomous or semi-autonomous vehicles. For instance, the vehicles may include one or more cameras that continuously or periodically capture images 128 and/or video of its surroundings as the vehicles move. As stated above, a particular delivery location 126 may be associated with a single image 128 that depicts the delivery location 126 (and its surroundings), or may be associated with multiple images 128 that depict the delivery location 126 (and its surroundings) from the same or different angles/perspectives.

In addition to images 128, the image database 204 may store videos (e.g., video clips) that capture dynamic events/activities that occur at a particular delivery location 126. For instance, the videos (or video clips) may depict events such as the occurrence and/or frequency of moving vehicles, pedestrians in motion (e.g., walking, running, etc.), activity in the front of the delivery location 126 (e.g., activity in the front yard), usage of entry and exit doors (including garage doors), opening/closing of windows, movement behind windows/doors, and any temporal variations/movements visible at the delivery location 126.

In certain embodiments, the one or more modules 124 may include a classifier training module 206, which may generate and/or store classifiers 130 and trained classifiers 208. In various embodiments, the classifiers 130 are used to identify, classify, recognize, and/or determine features, objects, persons, attributes, etc., (i.e., the scene attributes 132) that are depicted in the images 128 of the delivery locations 126. The classifiers 130 may correspond to one or more algorithms, such as object detection algorithms, scene detection algorithms, pattern recognition algorithms, etc., that are applied to the images 128 to identify, detect, classify, categorize, etc., the scene attributes 132. For instance, the classifiers 130 may be applied to an image 128 that depicts a residence and, as a result, the classifiers 130 may detect and positively identify certain features of the residence (e.g., a door, a fence, etc.), or at least classify or categorize features into different classifications or categories, respectively. The classifiers 130 may be applied to a training set of data, which may include the images 128. By applying the classifiers 130 to the images 128, the service provider 102 may generate trained classifiers 208, which may more accurately identify or detect the scene attributes 132 (e.g., a driveway, a gate, a broken window, etc.) associated with a delivery location 126.

In various embodiments, the classifiers 130 may be used in conjunction with one or more predictive models, which may include a group method of data handling, Naïve Bayes, k-nearest neighbor algorithm, majority classifier, support vector machines, random forests, boosted trees, Classification and Regression Trees (CART), neural networks, ordinary least square, regression analysis, and so on. Moreover, the classifiers 130 may detect/identify the scene attributes 132 using one or more machine learning techniques, which may include supervised learning, unsupervised learning, semi-supervised learning, classification analysis, regression analysis, clustering, recognition, etc. Moreover, any other types of algorithms or classifiers 130 may also be used.

As stated above, the classifiers 130 and the trained classifiers 208 may be utilized to identify, detect, extract, etc., scene attributes 132 from the images 128, which depict the delivery locations 126. That is, the service provider 102 may use the classifiers 130 to obtain a set of salient visual cues with respect to a delivery location 126 depicted in an image 128. The detection and classification of these visual cues, as well as the frequency at which the visual cues occur over a set of images 128 and/or a set of depicted delivery locations 126, may result in the scene attributes 132 for the delivery locations 126. In some embodiments, a particular image 128 that depicts a delivery location 126 may be segmented or partitioned into multiple segments/partitions, which may appear as a grid. The classifiers 130 may be applied to each segment/partition in order to identify/detect the scene attributes 132 within each segment/partition.

The service provider 102 may train the classifiers 130 to learn to identify, detect, recognize, and/or classify different types of visual attributes, such as individuals, driveways, streetlights, windows, etc. The service provider 102 may also assign a confidence value to each detected/identified scene attribute 132, where the confidence value indicates a likelihood/confidence that the scene attribute 132 was accurately identified. For instance, if the classifiers 130 identified a window depicted in an image 128, the confidence value may indicate a likelihood that the window is in fact a window, as opposed to some other visual attribute (e.g., a door). The confidence values for different scene attributes 132 may vary based on the corresponding likelihood that the scene attributes 132 were correctly identified/detected.

In various embodiments, a scene attribute determination module 210 may identify, detect, extract, etc., scene attributes 132 from images 128 that depict delivery locations 126 associated with different customers 110. That is, the scene attribute determination module 210 may identify/detect physical objects, features, visual attributes, etc., of a scene that includes a delivery location 126. Examples of such scene attributes 132 may include the existence of numbers, characters, symbols, logos, etc., depicted in the scene, which may indicate address numbers or signage of the delivery location 126 or other location/business signs (e.g., a street sign) that may aid in the visual recognition of a delivery address. The scene attributes 132 may also correspond to other objects/features associated with the delivery location 126, such as entrances (e.g., doors, garage doors, etc.), windows, gates, fences, driveways, porches, decks, stairs, and so on. Moreover, the scene attributes 132 may include streetlights, lamp posts, lighting fixtures, lighted signs, surveillance cameras, or security signs. The building characteristics of the delivery location 126, such as the condition and/or quality of a façade (e.g., brick, siding, glass, plaster, the presence of graffiti, disrepair, etc.), paint, roof, and windows may also be determined. Other scene attributes 132 may include foliage attributes, such as foliage being manicured or unkept, the height or shape of a bush/hedge, etc., and/or the detection of arbors, trellises, garden art, a picket fence, lawns, etc. The presence of traditional or dynamic entities, such as pedestrians, vehicles (e.g., parked or moving cars, motorcycles, off road vehicles, etc.), pets, bicycles, toys, etc., may also be considered scene attributes 132. Some or all of the scene attributes 132 may allow the service provider 102 to determine the type of delivery location 126 (e.g., residential, commercial, etc.), such as a single family home, an apartment building, a business, a high rise building, a townhouse, a multi-residence unit, a gated community, and so on.

Moreover, in various embodiments, the scene attribute determination module 210 may detect or determine the absence of certain scene attributes 132 with respect to a delivery location 126. For instance, it may be determined that a delivery location 126 depicted in an image 128 lacks outdoor lights or streetlights (possibly resulting in poor lighting conditions at night), lacks a driveway (possibly resulting in limited on-street parking) or lacks vehicles parked in a driveway or on the street (possibly resulting in a higher/lower estimated parking time). The absence of certain scene attributes 132 may be indicative or predictive of certain delivery attributes 134 or delivery defects.

In additional embodiments, a delivery attribute determination module 212 may generate, store, or otherwise be associated with delivery attributes 134 that correspond to different delivery locations 126. In particular, the delivery attributes 134 may correspond to historical delivery data associated with each delivery location 126. For instance, and for a particular delivery location 126, the delivery attributes 134 for that delivery location 126 may indicate the success, or lack thereof, of deliveries to that delivery location 126, and possibly deliveries to surrounding delivery locations 126. Accordingly, the delivery attributes 134 may indicate a number and/or frequency of successful deliveries where a deliverer 106 was able to locate and access the delivery location 126, deliver the item 116/package 118 to an appropriate delivery point, and the customer 110 at that delivery location 126 actually received the item 116/package 118.

On the other hand, the delivery attributes 134 may indicate the number and/or frequency of delivery defects associated with each delivery location 126. For a particular delivery location 126, such delivery defects may include the number and/or frequency of instances in which a deliverer 106 was unable to locate and/or access the delivery location 126. This could be due to the lack of address numbers on the house, lack of parking near the delivery location 126, existence of a fence or locked gate/door, existence of an aggressive pet, and so on. Delivery defects may also include the number and/or frequency of items 116/packages 118 that were successfully delivered but were not received by the customer 110 associated with that delivery location 126. For instance, a deliverer 106 may have placed an item 116/package 118 at a delivery location 126/point, but the item 116/package 118 may have been stolen, resulting in the customer 110 not receiving the item 116/package 118. Moreover, delivery defects may include the number and/or frequency of items 116/packages 118 that were delivered to an incorrect delivery location 126, such as a neighbor's house, an incorrect address, etc.

In some embodiments, the delivery attributes 134 may correspond to the amount of time it has taken deliverers 106 to park ("parking time"), including an average parking time, and/or an amount of time it has taken deliverers 106 to deliver the items 116/packages 118 after parking a vehicle ("delivery time"), including an average delivery time. Delivery defects associated with these types of delivery attributes 134 may include higher than average parking times or parking times that are greater than a threshold amount of time, which may be caused by a lack of parking near the delivery location 126, or higher than average delivery times or delivery times that are greater than a threshold amount of time, which may be caused by the deliverer 106 having difficulty delivering the item 116/package 118 at the delivery location 126/point (e.g., parking further from the delivery location 126, a fence/gate, a locked door, etc.).

In various embodiments, the delivery attributes 134 may be determined, obtained from, received by, etc., any number of different sources. More particularly, the delivery attributes 134 with respect to a particular delivery location 126 may be provided by one or more customers 110 or by any person or entity that delivered, or at least attempted to deliver, the item 116/package 118 to the delivery location 126. For instance, the delivery attributes 134 may be determined, obtained from, received by, etc., the deliverers 106, an entity associated with the deliverers 106, such as the service provider 102 or a third party, or a delivery service that facilitated the delivery of the items 116/packages 118. In various embodiments, determination of the delivery attributes 134 may be crowdsourced, meaning that the delivery attributes 134 for various delivery locations 126 may be based on information provided by any number of persons, entities, or services that may or may not be associated with those delivery locations 126.

As illustrated, a correlation determination module 214 may determine or generate correlations 136 between scene attributes 132 and delivery attributes 134 associated with a delivery location 126. That is, based on scene attributes 132 observed for a delivery location 126 and delivery attributes 134/delivery defects that have previously been determined for that delivery location 126, the correlation determination module 214 may determine the correlations 136, which may indicate that certain scene attributes 132 (e.g., number of windows, a driveway, a gate, etc.) are predictive or indicative of certain delivery attributes 134 and/or delivery defects (e.g., inability to locate/access delivery location 126, delivered but not received items 116/packages 118, etc.). Moreover, based on the scene attributes 132 of a delivery location 126 and historical delivery data (i.e., the delivery attributes 134), the classifiers 130 are able to learn that certain scene attributes 132 are predictive/indicative of certain delivery defects, such as the deliverer 106 delivering the item 116/package 118 to an incorrect delivery location 126, the deliverer 106 being unable to locate and/or access the intended delivery location 126, delivered but not received (stolen) items 116/packages 118, higher parking times, higher delivery times, and so on. Such learning/training of the classifiers 130 may result in the trained classifiers 208.

For instance, if a delivery location 126 is determined to have a higher number of windows, then it may be determined that the delivery location 126 is an apartment building, as opposed to a single family residence. Since certain apartment buildings have locked gates/doors, the presence of a higher number of windows may indicate that delivery will be more difficult, resulting in additional instances of the deliverer 106 being unable to access the delivery location 126/point. An inability to access a delivery point 126 may also be due to a fence, an aggressive pet, and so on. Moreover, the absence of address numbers or signage may be indicate a higher likelihood of the deliverer 106 being unable to locate the delivery location 126. On the contrary, the presence of streetlights or other outdoor lights may indicate a higher likelihood that the deliverer 106 will be able to locate the delivery location 126 and subsequently deliver the item 116/package 118. In some instances, a porch or door that is intended to serve as the delivery point of the delivery location 126 may be obstructed (e.g., due to foliage). This may result in the item 116/package 118 being delivered and not received by the customer 110 (e.g., a stolen item 116/package 118). In other embodiments, additional vehicles parked on a street of the delivery location 126 or the absence of driveways (resulting in less on-street parking) may indicate higher than normal parking times and/or delivery times for that delivery location 126.

Based at least partly on the scene attributes 132, the delivery attributes 134, and/or the correlations 136 between the scene attributes 132 and the delivery attributes 134 for delivery locations 126, a score generation module 216 may generate or determine one or more scores 138 for each delivery location 126. In various embodiments, the scores 138 may be one or more numerical values (e.g. "1.0" being high risk, "0.0" being low risk), characters/text (e.g., a written description), symbols (e.g., thumbs up/down, a number of stars, etc.), icons, and/or graphics that indicate information regarding the delivery of items 116/packages 118 to a particular delivery location 126. For instance, the scores 138 may represent the likelihood of a successful delivery of one or more items 116/packages 118 to a delivery location 126. Moreover, the scores 138 may represent a relative risk or likelihood of various delivery defects with respect to a delivery location 126, such as the risk/likelihood of being unable to locate and/or access the delivery location 126, the risk/likelihood of an incorrect delivery, the risk/likelihood of a delivered but not received item 116/package 118, and so on. In additional embodiments, the scores 138 may represent the ease or difficulty of parking near the delivery location 126, such as availability of parking (e.g., readily available, limited, no parking, etc.) or an average parking time (e.g., a number of seconds, minutes, etc.) for previous deliveries to that delivery location 126 or previous deliveries to nearby delivery locations 126 that are within a certain distance from the delivery location 126. The scores 138 may also represent an ease or difficulty of delivering the item 116/package 118 to the delivery location 126/delivery point once a deliverer 106 has parked his/her vehicle, which may be represented by an average delivery time (e.g., number of seconds, minutes, etc.) of previous deliveries to that delivery location 126 (or nearby delivery locations 126). Accordingly, the risk scores 138 for a delivery location 126 may be determined based on the detected scene attributes 132 depicted in one or more images 128 of that delivery location 126 and the success or difficulty of prior deliveries to that delivery location 126.

As the correlation determination module 214 continues to determine additional correlations 136 between scene attributes 132 and delivery attributes 134 of different delivery locations 126, the service provider 102 may determine with a higher degree of confidence that certain scene attributes 132 are predictive or indicative of certain delivery attributes 134 or delivery defects. More particularly, based on images 128 that depict delivery locations 126 in different areas (e.g., neighborhoods, zip codes, etc.), the service provider 102 may determine scene attributes 132 that occur more or less frequently in those areas. In some embodiments, a heat map may be used to indicate the presence, frequency, or absence of certain scene attributes 132 in different areas. Moreover, since the service provider 102 has access to data indicating deliveries of items 116/packages 118 to delivery locations 126 within those different areas, the service provider 102 may determine which delivery defects occur more or less frequently in those areas. That is, for a particular area, the service provider 102 may determine that a certain scene attribute 132 occurred more or less frequency and that a delivery defect was more or less prevalent. Using the heat map example, this may be visually illustrated by two circles (or other shapes) that represent the occurrence (or lack thereof) and/or frequency of scene attributes 132 and delivery defects. An overlap in the two circles may indicate that the presence or absence of that scene attribute 132 is predictive of the presence or absence of that delivery defect.

As an illustrative example, assume that an area includes delivery locations 126 that have a significant number of windows (e.g., more than a threshold amount), fences, and/or gates. Further assume that this area experiences a greater number of instances in which deliverers 106 are unable to access delivery locations 126. Here, the greater number of windows may indicate that this area includes a greater number of apartment buildings, which typically include a gated or locked entrance. A locked gate, a locked door, a fence, etc., could make it more difficult for a deliverer 106 to access a delivery location 126. As a result, the service provider 102 may determine that the existence of these scene attributes 132 may be predictive or indicative of deliverers 106 being unable to access certain delivery locations 126. As a result, based on the correlations 136 and/or the risk scores 138, the service provider 102 may determine that the presence or absence of certain scene attributes 132 are predictive/indicative of higher instances of certain delivery defects. The service provider 102 may also determine that the presence or absence of certain scene attributes 132 are predictive/indicative of lower instances of other delivery defects.

Based at least partly on the correlations 136 and/or the scores 138, a delivery instruction determination module 218 may determine one or more delivery instructions 140 to a deliverer 106 that is to deliver an item 116/package 118 to a delivery location 126 of a customer 110 that placed the order 144 for the item 116. In some embodiments, the delivery instructions 140 may be provided to a deliverer 106 via a corresponding deliverer device 108 using an e-mail message, a text message, an application residing on the deliverer device 108, and so on.

In various embodiments, the computer-readable media 122 may include a delivery plan determination module 220.

Based at least partly on the scene attributes 132 and delivery attributes 134 associated with various delivery locations 126, as well as the correlations 136 and/or scores 138 associated with those delivery locations 126, the delivery plan determination module 220 may generate, determine, and/or adjust one or more delivery plans 142 or delivery routes relating to the delivery of items 116/packages 118 to different delivery locations 126.

In some instances, the delivery plans 142 may correspond to the items 116/packages 118 that a particular deliverer 106 is to deliver to various delivery locations 126 and/or the route in which a deliverer 106 is to take to deliver items 116/packages 118. For instance, the service provider 102 may determine or adjust the number of items/packages 116 to be delivered by a deliverer 106 on a particular delivery route and/or the number of delivery locations 126 that the deliverer 106 is to visit on a particular route. This may be determined or adjusted based on the specific delivery locations 126 in which items 116/packages 118 are to be delivered, the average parking time for those delivery locations 126, and/or the average delivery time for those delivery locations 126, among other factors. That is, if the parking/delivery time is higher for certain delivery locations 126 on a delivery route, the service provider 102 may reduce the number of items 116/packages 118 to be delivered on that delivery route and/or reduce the number of delivery locations 126 in which items 116/packages 118 are to be delivered on that delivery route, and vice versa. That is, if there is an increase in parking/delivery time for one or more delivery locations 126 on a delivery route, or if items 116/packages 118 cannot be left unattended (e.g., a customer 110 signature is required for delivery), delivering the items 116/packages 118 included on the delivery will take a greater amount of time than anticipated. Reduction of the items 116/packages 118 to be delivered and/or the number of delivery locations 126 may allow for each of the items 116/packages 118 to be timely delivered.

For a particular delivery route for a deliverer 106, this information may also be used to determine the order in which the delivery locations 126 will be visited. Moreover, once the delivery route/plan has been determined, the service provider 102 may contact customers 110 (e.g., via a telephone call, an e-mail, a text message, a notification via a mobile application, etc.) that are to receive items 116/packages 118 to inform the customers 110 when (e.g., a specific time, a delivery window, etc.) they should expect to have their items 116/packages 118 be delivered. This delivery notification may include other information, such as the specific item(s) 116 to be delivered, an identity of the deliverer 106, a delivery point at which the item(s) 116 are to be delivered, and so on.

In certain embodiments, the service provider 102 may have previously facilitated the delivery of items 116/packages 118 to a particular delivery location 126. In this instance, the service provider 102 may already be aware of the delivery attributes 134 and/or delivery defects associated with that delivery location 126 (and its surroundings). As a result, the service provider 102 may provide appropriate delivery instructions 140 to the deliverer 106 without requiring the deliverer 106 to request information relating to the delivery.

In other instances, the service provider 102 may have little to no data regarding a delivery location 126 and/or a customer 110 associated with that delivery location 126. In these instances, the service provider 102 may not have access to one or more images 128 that depict the delivery location 126. Accordingly, the service provider 102 may request that the customer 110 and/or a deliverer 106 capture one or more images 128 or video of the delivery location 126, and then transmit the image(s) 128 to the service provider 102. The service provider 102 may then determine scene attributes 132 of the delivery location 126 based on the image(s) 128, and determine that the detected scene attribute(s) 132 are predictive or indicative of certain delivery defects. Based on the likely delivery defects, the service provider 102 may determine the delivery instructions 140 for deliverer 106. For instance, if it is determined that the delivery location 126 does not include a driveway, or that the street typically includes a significant number of parked vehicles, which may indicate limited parking availability, the delivery instructions 140 may be for the deliverer 106 to find the first available parking spot.

Other delivery instructions 140 may include a location of where to place the item 116/package 118, requesting a signature of the customer 110 upon delivery, instructions to not deliver the item 116/package 118 if the customer 110 is not present, instructions to deliver the item 116/package 118 to a neighbor if the customer 110 is not present, a code or location of a key to open a door/gate in order to access the delivery location 126, an estimated parking time, a level of parking difficulty, an estimated delivery time, a level of delivery difficulty, instructions to confirm the address prior to delivering the item 116/package 118, and so on. As will be discussed in additional detail herein, the delivery instructions 140 may include the risk scores 138 and/or a level of difficulty of findability/access/delivery with respect to the delivery location 126 (e.g., high, medium, low, etc.).

In various embodiments, the correlations 136 may be used to determine the delivery instructions 140 for a delivery location 126 in at least two different ways. First, images 128 that depict known delivery locations 126 may be used to detect particular scene attributes 132 of that delivery location 126. Then, based on the delivery attributes 134/delivery defects for that delivery location 126 (or other delivery locations 126 within a threshold distance from the delivery location 126), the service provider 102 may determine the correlations 136 between these scene attributes 132 and delivery attributes 134/delivery defects. The previously determined correlations 136 and/or scores 138 may be used to determine delivery instructions 140 for that delivery location 126. In some instances, the scene attributes 132 of the delivery location 126 may indicate the type of the delivery location 126 (e.g., residential, commercial, etc.). For instance, if the delivery location 126 is likely a single family residence, the service provider 102 may cause a deliverer 106 to deliver an item 116/package 118 on a weekend (e.g., a weekend route) or during a weekday evening (e.g., a weekday evening route) since the customer 110 is likely to be home. However, if the delivery location 126 is mostly likely a business that is typically open during the day on weekdays, the service provider 102 may cause a deliverer 106 to deliver items 116/packages 118 during business hours on a weekday (e.g., a daytime weekday route). Accordingly, the delivery instructions 140 may correspond to a time of delivery and/or a route used to deliver items 116/packages 118.

In other embodiments, and as stated above, the delivery instructions 140 may relate to which items 116/packages 118 the deliverer 106 is to transport. For instance, if it is determined that certain delivery locations 126 have higher estimated parking times, or a greater risk of the deliverer 106 being unable to locate and/or access the delivery locations 126, the amount of parking time and/or delivery time may increase. As a result, the delivery instructions 140 may instruct the deliverer 106 to decrease the number of items 116/packages 118 to deliver on a particular route. In other instances, a likely ease of delivery to certain delivery locations 126 may cause the service provider 102 to issue delivery instructions 140 that instruct the deliverer 106 to load additional items 116/packages 118 on his/her delivery vehicle.

Second, the delivery instructions 140 that are to be provided to a deliverer 106 may be determined in real-time, or near real-time. In some instances, a deliverer 106 that is to deliver an item 116/package 118 to a particular delivery location 126, may seek assistance regarding the delivery of the item 116/package 118. For instance, the deliverer 106 may not be aware of a delivery point in which the item 116/package 118 is to be delivered or may not have access to the delivery location 126 due to a fence, a locked door/gate, or the presence of an aggressive pet. In this situation, the service provider 102 may instruct the deliverer 106 to capture one or more images 128 of the delivery location 126 and provide the image(s) 128 to the service provider 102 via his/her deliverer device 108. Based on these images 128, the service provider 102 may detect various scene attributes 132 associated with the delivery location 126. The service provider 102 may then access previously determined correlations 136 between (1) the scene attributes 132 that were detected in the image(s) 128 and that were also associated with other delivery locations 126 and (2) delivery attributes 134/delivery defects determined for the other delivery locations 126. Based on these correlations 136, the service provider 102 may indicate that the scene attributes 132 detected in the image(s) 128 are likely to be predictive/indicative of certain delivery defects. The delivery instructions 140 provided to the deliverer 106 may be based on those identified delivery defects.

As an illustrative example, assume that the image(s) 128 provided by the deliverer 106, or any other image(s) 128 of the delivery location 126, depict scene attributes 132 such as foliage obstructing a delivery point (e.g., a door, a porch, etc.) in which the item 116/package 118 is to be placed, and the lack of a driveway. The service provider 102 may leverage previously determined correlations 136 between scene attributes 132 and delivery attributes 134 to determine that obstructions to a delivery point are predictive/indicative of an increased difficulty of the deliverer 106 to locate the delivery point (possibly due to the foliage obstructing an address number or other signage). The service provider 102 may also leverage the previously determined correlations 136 to determine that the lack of a driveway is predictive or indicative of increased parking difficulty (e.g., higher than average parking times). Accordingly, the service provider 102 may determine that the presence of the foliage may increase the likelihood of a deliverer 106 being unable to locate the delivery location 126, and the absence of a driveway may increase the likelihood that there is limited on-street parking, possibly resulting in an increased estimated parking time. As a result, the delivery instructions 140 provided to the deliverer 106 may request that the deliverer 106 confirm that the delivery location 126 is in fact correct before delivering the item 116/package 118. Since lack of driveways may be indicative of limited on-street parking, the delivery instructions 140 may also instruct the deliverer 106 to park in the first available parking spot, or indicate an estimated parking time or a higher than average parking time. As stated above, the delivery instructions 140 may include a written description relating to the delivery of the item 116/package 118, one or more of the scores 138, and so on.

Figure 3:
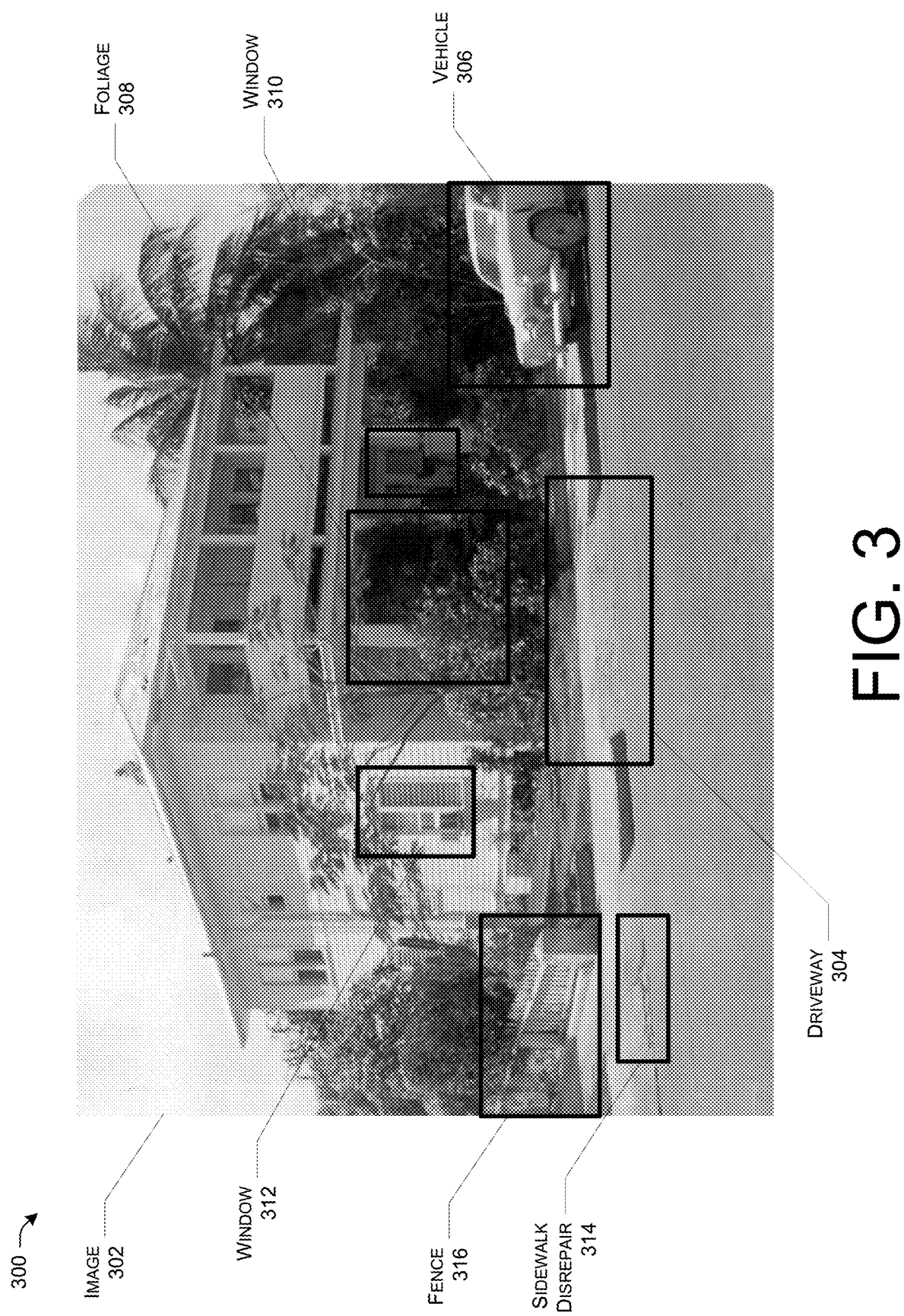
FIG. 3 illustrates an example diagram for identifying scene attributes associated with an image that depicts a delivery location.

FIG. 3 illustrates an example diagram 300 of an image of a delivery location and one or more scene attributes detected within the image. As stated above, the service provider 102 may capture, receive, obtain, etc., images 128 that depict various delivery locations 126, where a delivery location 126 corresponds to physical location associated with a customer 110 in which an item 116 and/or a package 118 is to be delivered. As illustrated in FIG. 3, an image 302 depicts a single family residence having various visual features, objects, and/or attributes. For instance, the service provider 102 may use one or more classifiers 130 to detect, identify, classify, categorize, etc., a driveway 304, a vehicle 306 parked on the street, foliage 308 obstructing a potential delivery point of the delivery location 126, a first window 310 of multiple windows at the delivery location 126, a second window 312 of the multiple windows, sidewalk disrepair 314 that is adjacent to the street, and a fence 316. The scene attributes 132 identified in FIG. 3 are merely illustrative, and it is contemplated that other scene attributes 132 associated with the delivery location 126 may also be detected and identified.

In various embodiments, one or more correlations 136 between the scene attributes 132 identified/detected in the image 302 and delivery attributes 134/delivery defects for the delivery location 126 may be determined. In other embodiments, the scene attributes 132 detected/identified in the image 302, which may be captured by the deliverer 106, may be indicative or predictive of certain delivery attributes 134/delivery defects. For instance, presence of the driveway 304 may indicate that on-street parking is available for a deliverer 106 that is to deliver an item 116/package 118 to the delivery location 126. However, the presence of the vehicle 306 parked on the street may indicate that on-street parking may also be limited. Presence of the vehicle may also indicate that the customer 110 is currently home, which may help ensure a successful delivery. Existence of the foliage 308 that is blocking or obstructing steps, a porch, or a door (i.e., a delivery point) may indicate that the delivery location 126 is unkept, or that one may potentially steal a delivered item 116/package 118 without being noticed. Accordingly, delivery instructions 140 provided to the deliverer 106 may request that the deliverer 106 not deliver the item 116/package 118 if the customer 110 is not home, or possibly deliver the item 116/package 118 to a neighbor. Existence of the foliage 308 may also obstruct an address number or signage indicating that the home depicted in the image 302 is in fact the correct delivery location 126. As a result, there may be a higher likelihood that the deliverer 106 will be unable to locate the delivery location 126 and the service provider 102 may request that the deliverer 106 confirm the address before delivering the item 116/package 118.

Figure 4:
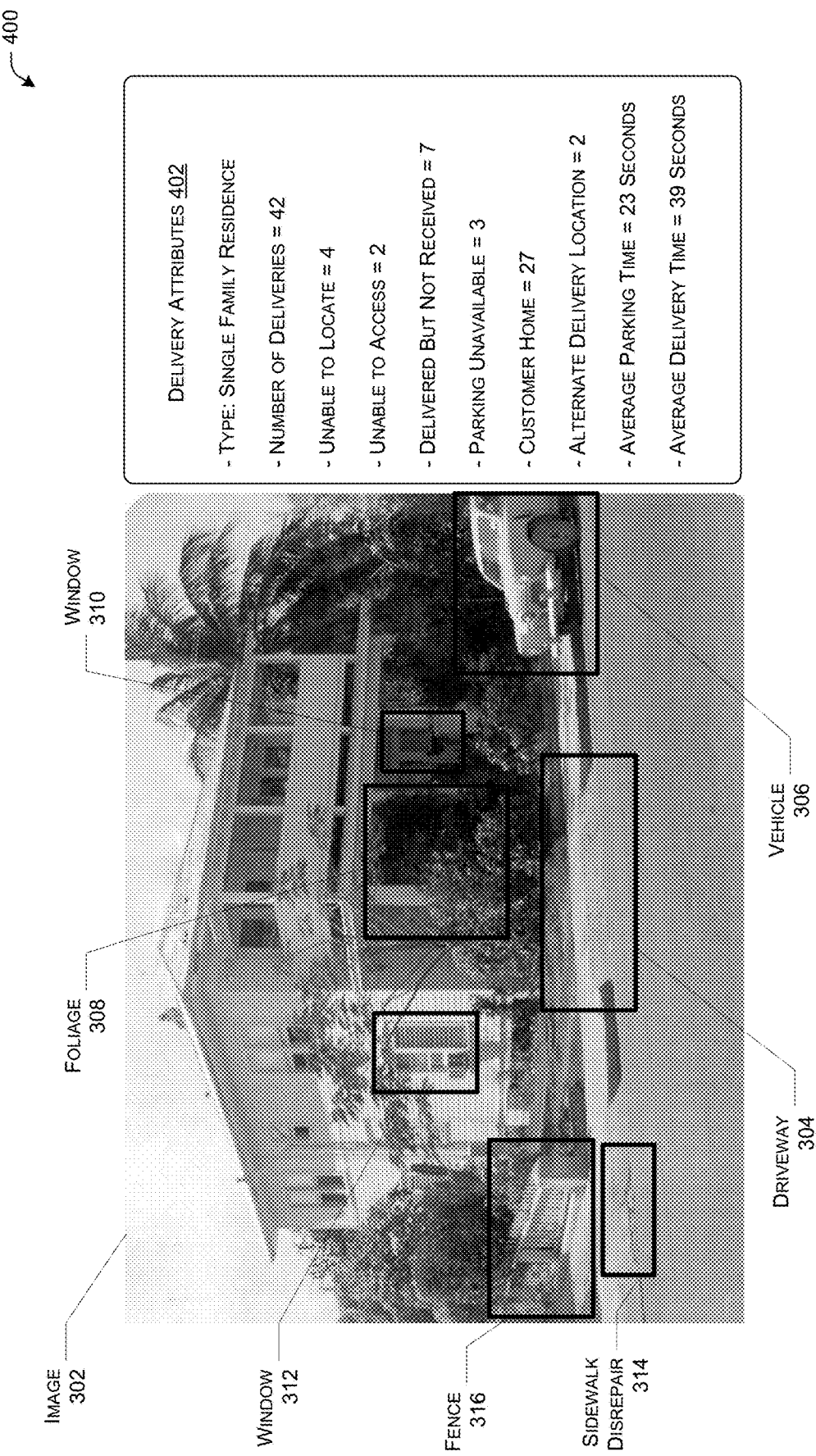
FIG. 4 illustrates an example diagram for determining delivery attributes of a delivery location that is depicted in an image.

FIG. 4 illustrates an example diagram 400 of an image of a delivery location, one or more scene attributes detected within the image, and delivery attributes associated with the delivery location. For the purposes of this discussion, the image 302 illustrated in FIG. 4 is the same image 302 illustrated in FIG. 3, or at least depicts the same delivery location 126 as that illustrated in FIG. 3. As shown, the scene attributes 132 detected/identified within the image 302 may include the driveway 304, the vehicle 306, the foliage 308, the first window 310, the second window 312, the sidewalk disrepair 314, and the fence 316.

In addition to the scene attributes 132 associated with the delivery location 126, the diagram 400 also identifies various delivery attributes 402 associated with the delivery location 126. As set forth above, the service provider 102 may determine and maintain historical data relating to prior deliveries of items 116/packages 118 to various delivery locations 126. Here, the delivery attributes 402 may correspond to information about, and prior deliveries to, the delivery location 126 depicted in the image 302. For instance, the delivery attributes 402 may include any type of information/delivery information, including the type of the delivery location (single family residence), the number of deliveries previously made to the delivery location 126 (42), a number of times a deliverer 106 was unable to locate the delivery location 126 (4), a number of times a deliverer 106 was unable to access the delivery location 126, or a delivery point associated with the delivery location 126 (2), a number of times an item 116/package 118 was delivered but not received by the customer 110 (7), possibly due to theft, a number of times in which parking was unavailable (3), a number of times in which the customer 110 was present at the time of delivery (27), the number of times the item 116/package 118 was delivered to an alternative location, such as a neighbor's home (2), an average parking time per delivery (23 seconds), and an average delivery time per delivery (39 seconds). Upon determining the delivery attributes 402, the service provider 102 may determine correlations 136 between the scene attributes 132 and the delivery attributes 402, and possibly leverage the correlations 136 to determine whether certain scene attributes 132 are indicative or predictive of certain delivery attributes 402 (or delivery defects).

Figure 5:
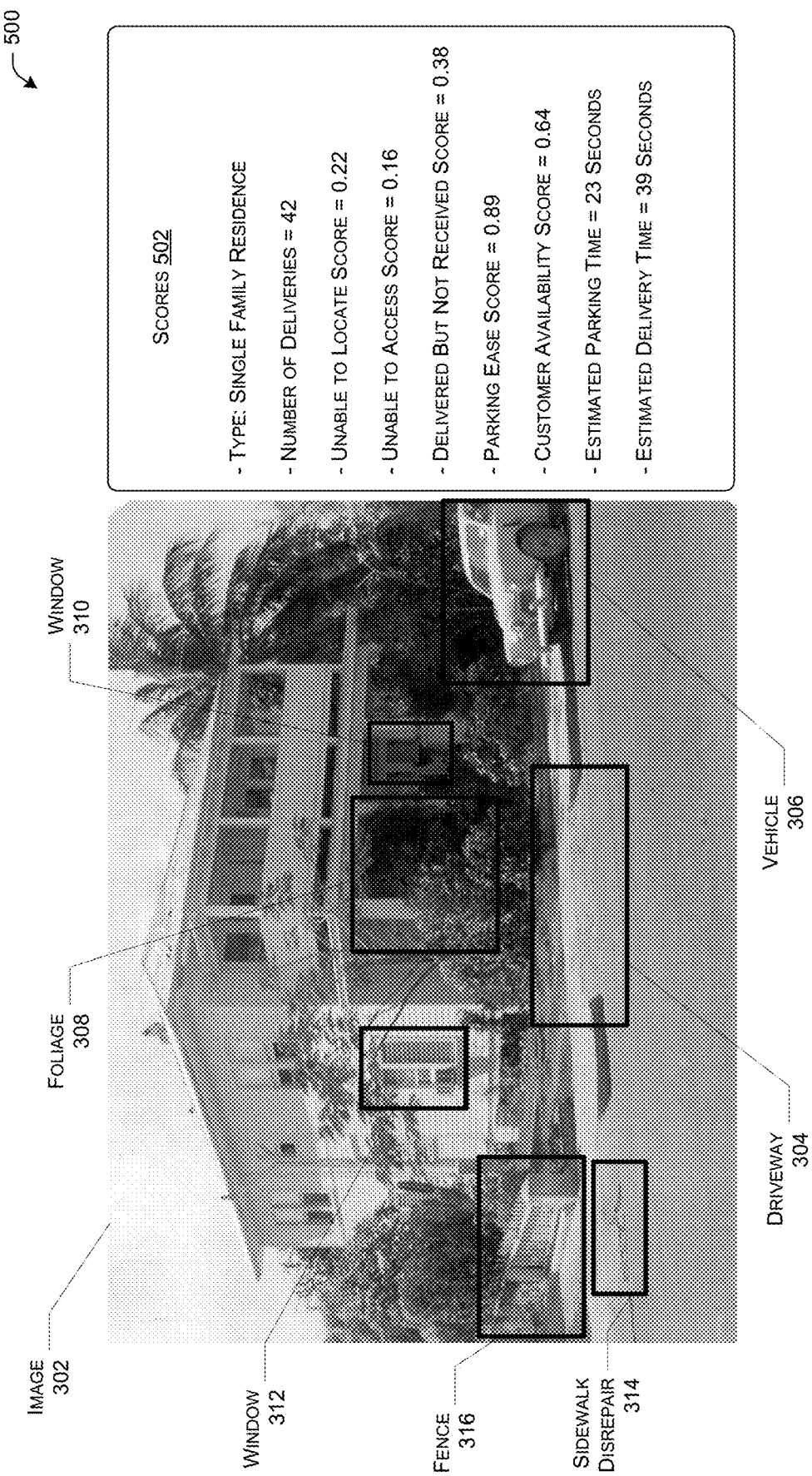
FIG. 5 illustrates an example diagram for determining scores associated with correlations between scene attributes and delivery attributes associated with a delivery location that is depicted in an image.

FIG. 5 illustrates an example diagram 500 of an image of a delivery location, one or more scene attributes detected within the image, and scores associated with the delivery location. For the purposes of this discussion, the image 302 illustrated in FIG. 5 is the same image 302 illustrated in FIGS. 3 and 4, or at least depicts the same delivery location 126 as that illustrated in FIGS. 3 and 4. As shown, the scene attributes 132 detected/identified within the image 302 may include the driveway 304, the vehicle 306, the foliage 308, the first window 310, the second window 312, the sidewalk disrepair 314, and the fence 316.

Based on correlations 136 determined between the scene attributes 132 and the delivery attributes 402 (illustrated in FIG. 4), the service provider 102 may determine one or more scores 502 (risk scores) relating to the delivery location 126. The scores 502 may indicate the ease or difficulty of delivering items 116/packages 118 to the delivery location 126, as well as the likelihood of delivery defects associated with future deliveries of items 116/packages 118 to the delivery location 126. The diagram 500 may or may not indicate the type of the delivery location 126 (single family residence) and/or the number of prior deliveries by the service provider 102 to the delivery location 126 (42). As shown, some of the scores 502 may be represented as a numerical value that indicates a level of risk/likelihood of a particular delivery defect occurring during delivery. For instance, this delivery location 126 has an "unable to locate score" of 0.22, wherein 1.0 is the highest amount of risk, and 0.0 is the lowest amount of risk. Accordingly, a score of 0.22 indicates a relatively low risk/likelihood of a deliverer 106 not being able to locate/find the delivery location 126. An "unable to access score" of 0.16 may indicate an even lower risk/likelihood that a deliverer 106 would be unable to access the delivery location 126. However, a "delivered but not received score" of 0.38 may indicate that there is a higher risk/likelihood that an item 116/package 118 would be delivered but not received by the customer 110, possibly due to theft. A "parking ease score" of 0.89 may indicate that a deliverer 106 would experience difficulty parking near the delivery location 126, and a "customer availability score" of 0.64 may indicate that the customer 110 typically is present, and is likely to be present, at the time of a delivery. Moreover, the "estimated parking time" of 23 seconds may be based on an average amount of time it previously took deliverers 106 to park near the delivery location 126, and an "estimated delivery time" of 39 seconds may be based on an average amount of time it previously took deliverers 106 to deliver the items 116/package 118 after parking a delivery vehicle.

However, the scores 502 illustrated in FIG. 5 are merely illustrative, and additional scores 502 may be determined/generated. For instance, the scores 502 may include a first time delivery success score that indicates a percentage or ratio in which a first attempted delivery to the delivery location 126 was successful (delivered and received by the customer 110). The scores 502 may also include a score that indicates the security/safety of the deliverer 106 and/or the delivery vehicle while making a delivery to the delivery location 126. Other scores 502 may also be contemplated. For the purposes of this discussion, the diagrams illustrated in FIGS. 3-5 may be representative of a user interface that is, or is not, provided to deliverers 106.

Figure 6:
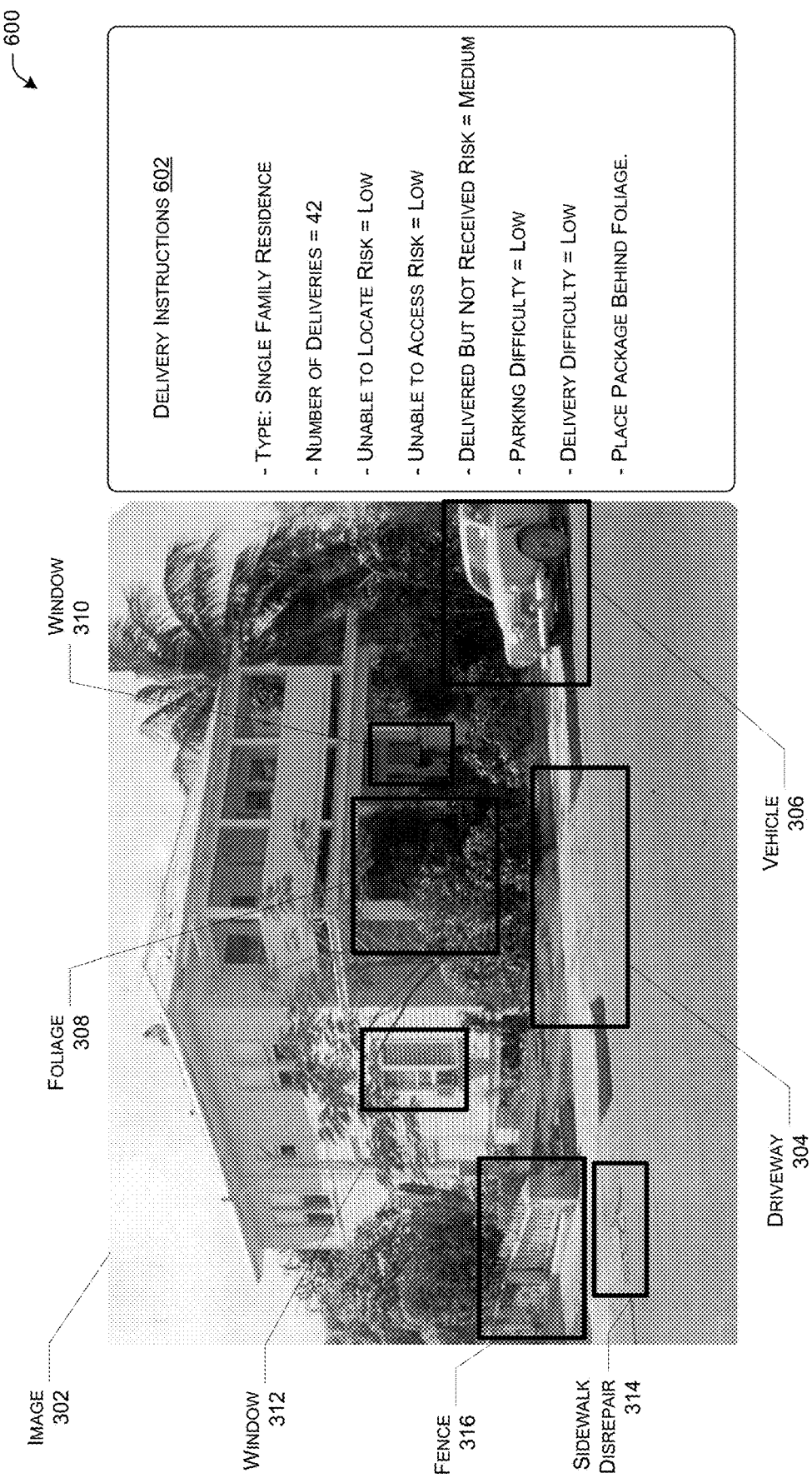
FIG. 6 illustrates an example diagram for presenting delivery instructions associated with a delivery location that is depicted in an image.

FIG. 6 illustrates an example diagram 600 of an image of a delivery location, one or more scene attributes detected within the image, and delivery instructions associated with deliveries to the delivery location. For the purposes of this discussion, the image 302 illustrated in FIG. 6 is the same image 302 illustrated in FIGS. 3-5, or at least depicts the same delivery location 126 as that illustrated in FIGS. 3-5. As shown, the scene attributes 132 detected/identified within the image 302 may include the driveway 304, the vehicle 306, the foliage 308, the first window 310, the second window 312, the sidewalk disrepair 314, and the fence 316.

In various embodiments, the delivery instructions 602 are to be provided to deliverers 106 that are to deliver items 116/packages 118 to the delivery location 126, and are based on the scene attributes 132, the delivery attributes 402, the correlations 136, and/or the scores 502 that are associated with the delivery location 126. That is, the diagram 600 may be presented via a user interface that is accessible via deliverer devices 108 of deliverers 106. In various embodiments, the delivery instructions 602 may include the type of the delivery location 126 (single family residence) and/or the number of prior deliveries to that delivery location 126 (42). As stated above, the delivery instructions 602 that are provided to a deliverer 106 may include text, the scores 502, and/or any other information that may assist the deliverer 106 in delivering items 116/packages 118 to the delivery location 126. By providing the delivery instructions 602 to a deliverer device 108 associated with a deliverer 106, the deliverer 106 may have sufficient information to deliver the item 116/package 118, without requiring the deliverer 106 to request additional information (via telephone, e-mail, text message, etc.) from an associate of the service provider 102.

As shown, the delivery instructions 602 may include a risk level of the deliverer 106 not being able to locate the delivery location 126 ("unable to locate risk"), which is "low." This means that there is a relatively low likelihood that the deliverer 106 would be unable to locate the delivery location 126, possibly due to poor signage, foliage obstructing a delivery point, etc. Similarly, the delivery instructions 602 may also include a risk level of the deliverer 106 not being able to access the delivery location 126 ("unable to access risk"), which is also "low." This means that there is a relatively low likelihood that the deliverer 106 would be unable to access the delivery location 126, possibly due to the presence of a locked gate/door, a pet, etc. Moreover, the delivery instructions 602 may also include a risk level of the item 116/package 118 being delivered but not received by the customer 110 ("delivered but not received risk"), which is "medium." This means that there is a moderate likelihood that the customer 110 would not receive an item 116/package 118 delivered to the delivery location 126 by the deliverer 106, possibly due to theft of the item 116/package 118. In addition, the difficulty of parking for the deliverer 106 ("parking difficulty") and the difficulty of delivery ("delivery difficulty") are indicated as being "low," indicating that the ease/difficulty of parking the delivery vehicle and delivering the item 116/package 118 is high/low.

Moreover, the delivery instructions 602 may also include specific instructions regarding the delivery of items 116/packages 118 to the delivery location 126. For instance, as shown, the delivery instructions 602 indicate that the item 116/package 118 is to be placed behind the foliage 308 when delivered. That is, since there is a moderate risk of an item 116/package 118 being delivered but not received, possibly due to theft, the delivery instructions 602 may instruct the deliverer 106 to place the item 116/package 118 in a concealed location that would not be visible to individuals passing by the delivery location 126. Accordingly, the specific delivery instructions 602 may be based on the risk scores 138 associated with that delivery location 126. However, any other delivery instructions 602 may be included. Although the delivery instructions 602 are shown as text, the delivery instructions 602 may be presented as characters, images, symbols, numerical values, or any combination thereof. Moreover, some, all, or none of the delivery instructions 602 illustrated in FIG. 6 may be presented to the deliverer 106, and additional delivery instructions 602 may be presented as well.

Figure 7:
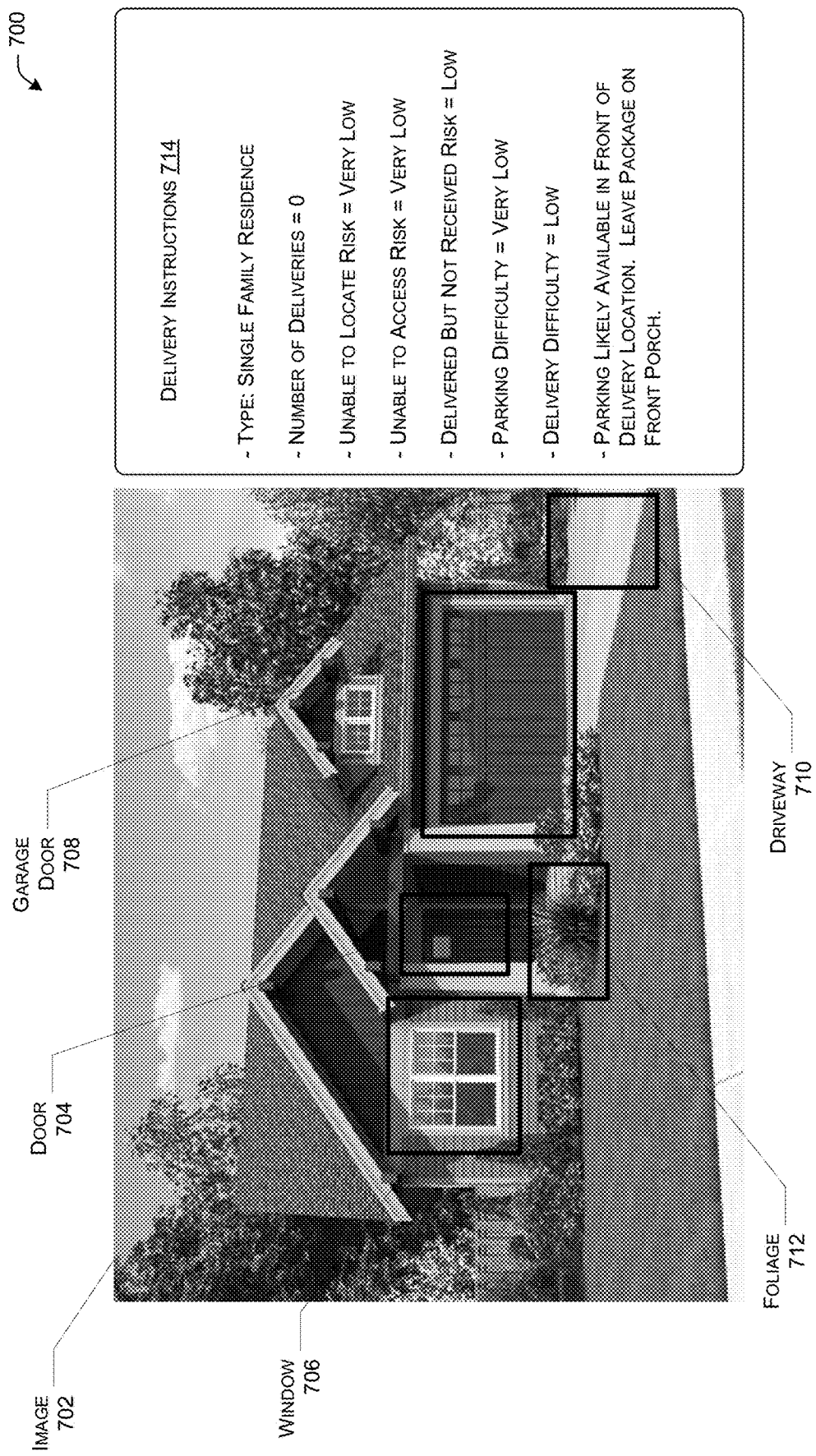
FIG. 7 illustrates an example diagram for presenting delivery instructions associated with a new delivery location that is depicted in an image.

FIG. 7 illustrates an example diagram 700 of an image of a new delivery location and one or more delivery instructions that are based on one or more scene attributes detected within the image. As shown, various scene attributes 132 depicted in the image 702 may be detected and possibly displayed. Examples of such scene attributes 132 may include a door 704, a window 706, a garage door 708, a driveway 710, and foliage 712.

For the purpose of this discussion, assume that the service provider 102 has not delivered any items 116/packages 118 to the delivery location 126 depicted in image 702, or at least very little information about the delivery location 126 is known. This is indicated by specifying that the "number of deliveries" for the delivery location 126 is zero. As a result, little to no delivery attributes 134/delivery defects associated with the delivery location 126 may be known. That is, since the service provider 102 has not previously delivered an item 116/package 118 to the delivery location 126, the service provider 102 may not have access to historical data relating to prior deliveries to that delivery location 126. Accordingly, the service provider 102 may leverage the scene attributes illustrated in FIG. 7 and correlations 136 between scene attributes 132 and delivery attributes 134 associated with different delivery locations 126 (and possibly the risk scores 138 determined based on the correlations 136) in order to predict or determine delivery attributes 134 and/or delivery defects (e.g., delivered but not received, deliverer 106 unable to access/locate delivery location 126, higher parking/delivery times, etc.) that are likely to occur with respect to the delivery location 126 depicted in the image 702. In various embodiments, the image 702 may be provided by the customer 110, captured and provided by the deliverer 106 upon arriving at the delivery location 126, or obtained in another manner (e.g., a service that captures street-based images 128).

For instance, assume that a first previously determined correlation 136 indicates that visibility of a door at a delivery location 126 and lack of foliage obstructing a delivery point are predictive or indicative of a deliverer 106 being able to access a delivery location 126. Since the image 702 depicts a visible door 704 and no objects obstructing a delivery point (e.g., the door 702 is not obstructed by the foliage 712), it is likely that a deliverer 106 would have relative ease accessing the delivery location 126 depicted in the image 702. As a result, the delivery instructions 714 provided to a deliverer 106 may indicate that the risk of him/her not being able to access the delivery location 126 is "very low." Moreover, assume that a second previously determined correlation 136 indicates that presence of a driveway and/or a garage is indicative or predictive of the availability of parking in proximity to the delivery location 126 (e.g., an increase in off-street parking may result in an increase in the availability of on-street parking). Here, since the delivery location 126 depicted in the image 702 includes both a garage door 708 (indicating the existence of a garage) and a driveway 710, it likely that a deliverer 106 would be able to find parking in close proximity the delivery location 126. Accordingly, the delivery instructions 714 may indicate that the "parking difficulty" for the delivery location 126 is "very low."

The delivery instructions 714 may include additional relevant information that would allow the deliverer 106 to more efficiently deliver an item 116/package 118 to the delivery location 126 depicted in the image 702. For instance, the delivery instructions 714 may include detailed instructions, such as indicating that parking is likely available near the delivery location 126, and that the deliverer 106 should leave the package 118 on the front porch. Although the delivery instructions 714 include different types of information relating to the deliverer 106, some, all, none, or additional information may be provided and displayed to the deliverer 106.

Figure 8:
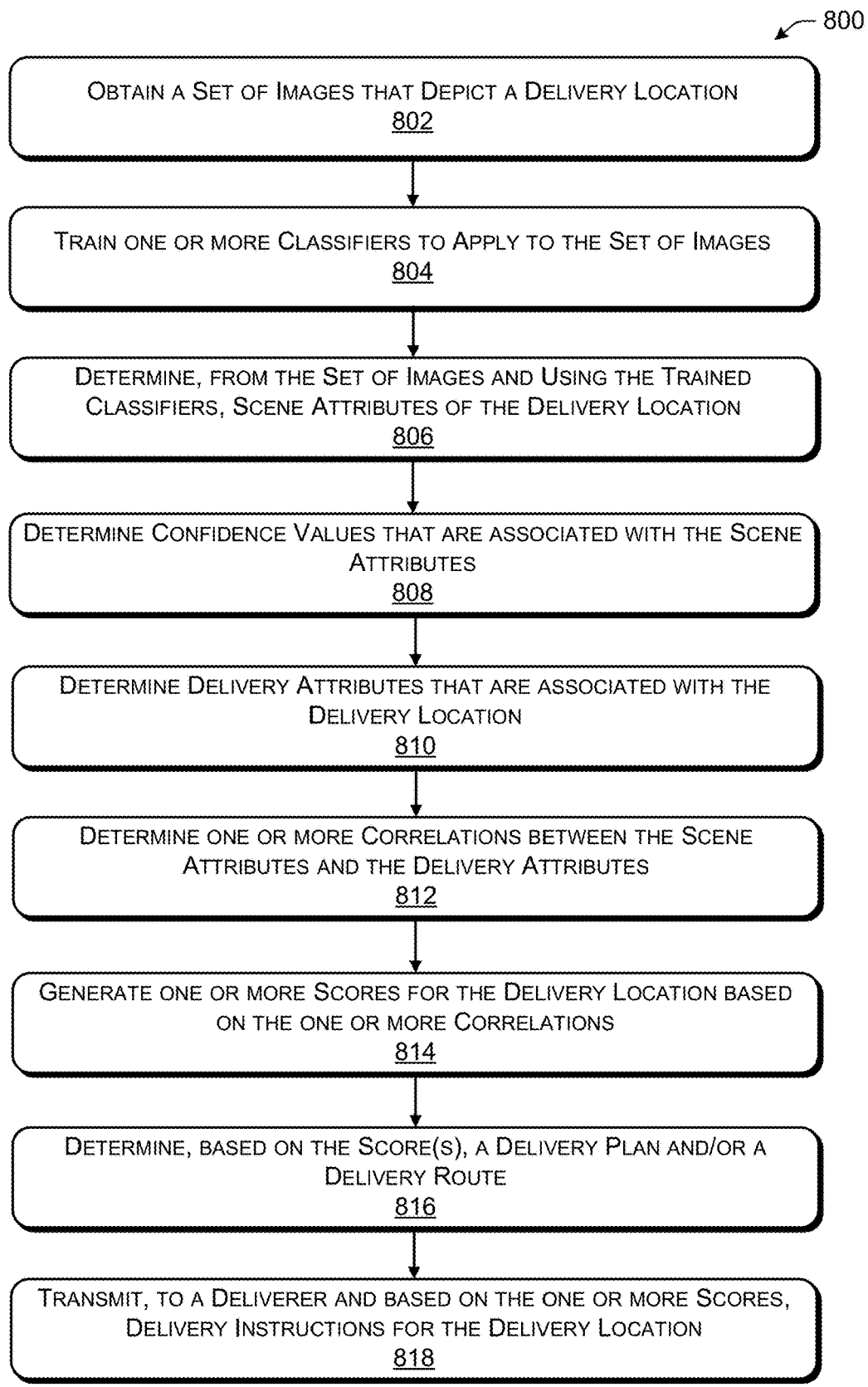
FIG. 8 is a flow diagram illustrating an example process of determining correlations between scene attributes and delivery attributes associated with delivery locations.
Figure 9:
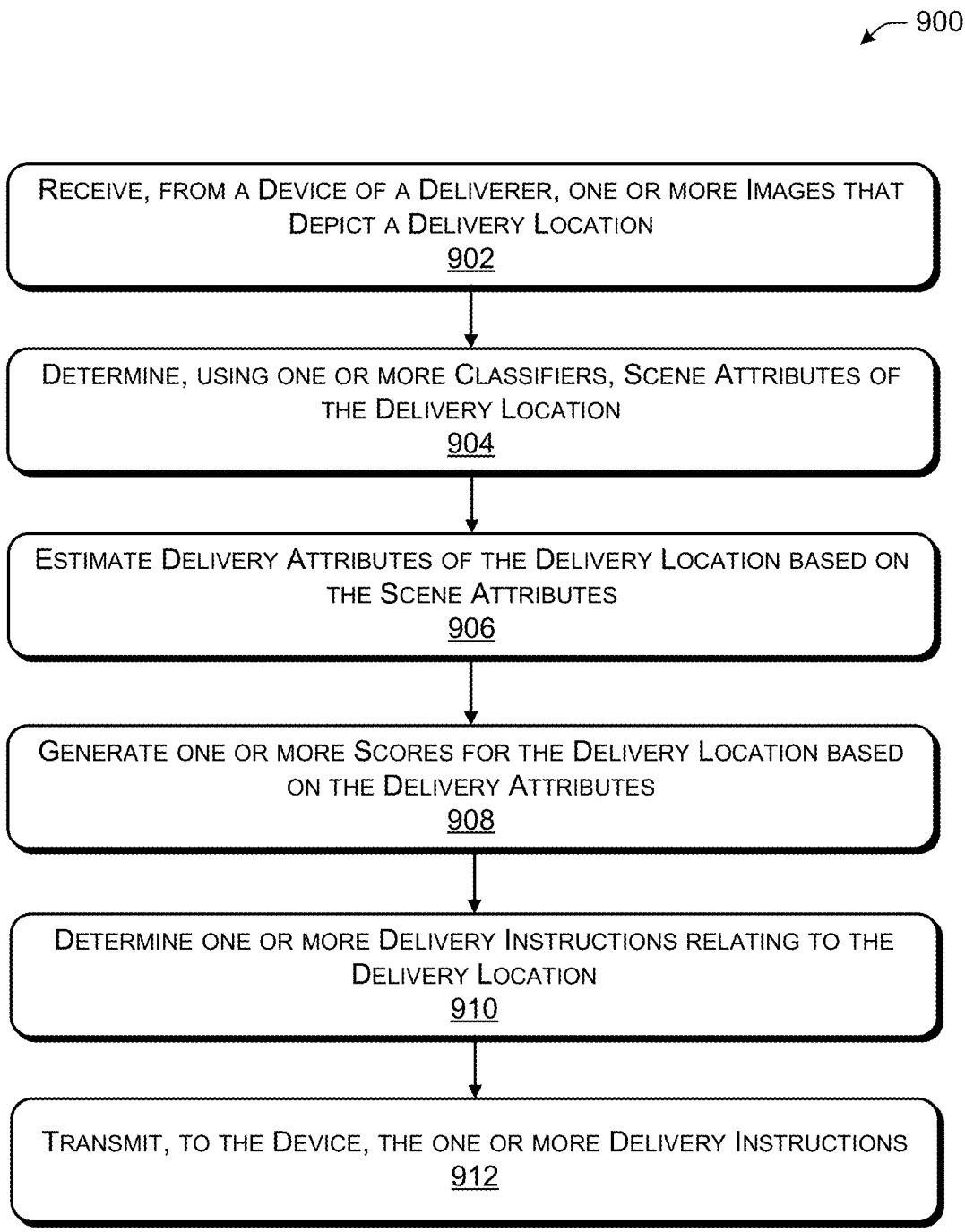
FIG. 9 is a flow diagram illustrating an example process of determining and presenting delivery instructions based on a delivery location that is depicted in an image.

FIGS. 8 and 9 illustrate example processes of determining delivery instructions for a delivery location based on correlations between scene attributes and delivery attributes associated with the delivery location. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 8 illustrates a flow diagram of an example process 800 of determining delivery instructions for a delivery location based on images that depict the delivery location. Moreover, the following actions described with respect to FIG. 8 may be performed by the service provider 102 and/or the content server(s) 104, as illustrated with respect to FIGS. 1-7.

Block 802 illustrates obtaining a set of images that depict a delivery location. In various embodiments, the service provider 102 may capture, obtain, receive, etc., one or more images 128 that depict a delivery location 126, such as a single family residence, an apartment building, a commercial establishment, etc. The images 128 may be captured by a customer 110 associated with the delivery location 126, one or more deliverers 106, cameras located on a delivery vehicle, from a service/vehicle that captures street-side images 128 of its surroundings.

Block 804 illustrates training one or more classifiers to apply to the set of images. In various embodiments, the service provider 102 may apply the classifiers 130 to a set of training data, such as the set of images 128, in order to train the classifiers 130. By training the classifiers 130, the service provider 102 may cause the classifiers 130 to learn how to detect, identify, classify, categorize, etc., the scene attributes 132 associated with the delivery location 126.

Block 806 illustrates determining, from the set of images and using the trained classifiers, scene attributes of the delivery location. For instance, the service provider 102 may detect/identify scene attributes 132 that are depicted in the image(s) 128 of the delivery location 126. The scene attributes 132 may include features, objects, and/or attributes that are visually depicted in the image(s) 128, such as a door, window, fence, driveway, vehicle, and so on.

Block 808 illustrates determining confidence values that are associated with the scene attributes. In various embodiments, the service provider 102 may determine a confidence value for each scene attribute 132 that is depicted/identified from the image(s) 128. The confidence value for a scene attribute 132 may represent a likelihood that the scene attribute 132 has been correctly and/or accurately detected/identified.

Block 810 illustrates determining delivery attributes that are associated with the delivery location. Provided that the service provider 102 has previously facilitated the delivery of items 116/packages 118 to the delivery location 126, the service provider 102 may determine and maintain delivery data associated with such deliveries, which may be referred to as delivery attributes 134 or delivery defects of the delivery location 126. For instance, the delivery attributes 134/delivery defects associated with the delivery location 126 may indicate the number and frequency of times in which the deliverer 106 was unable to access and/or locate the delivery location 126, times in which items 116/packages 118 were delivered but not received by the customer 110, incorrect deliveries, an estimated parking time, an estimated delivery time, and so on.

Block 812 illustrates determining one or more correlations between the scene attributes and the delivery attributes. In various embodiments, the correlations 136 may indicate that certain scene attributes 132 are indicative or predictive of certain delivery attributes 134/delivery defects. For instance, the correlations 136 may indicate that a gate or fence is indicative or predictive of a deliverer 106 not being able to access the delivery location 126.

Block 814 illustrates generating one or more scores for the delivery location based on the one or more correlations. More particularly, the scores 138 may indicate a level of risk of certain delivery attributes 134/delivery defects associated with the delivery of items 116/packages 118 to the delivery location 126.

Block 816 illustrates determining, based on the score(s), a delivery plan and/or a delivery route. In particular, based on the risk scores 138 for various delivery locations 126, the service provider 102 may determine a delivery plan 142 and/or a delivery route in which items 116/packages 118 are to be delivered to one or more delivery locations 126. The delivery plan 142 may correspond to the number of items 116/packages 118 that are to be delivered for a particular delivery route and/or the number of delivery locations 126 in which items 116/packages 118 will be delivered, which may be based on the estimated parking and/or delivery time for different delivery locations 126. The delivery plan 142 may also indicate the order in which the items 116/packages 118 will be delivered to the different delivery locations 126.

Block 818 illustrates transmitting, to a deliverer and based on the one or more scores, delivery instructions for the delivery location. In certain embodiments, the delivery instructions 140 may be determined based on the correlations 136 and/or the scores 138 associated with the delivery location 126. Moreover, the delivery instructions 140 may be provided to a deliverer 106 via a corresponding deliverer device 108, and may provide information that assists the deliverer 106 in delivering an item 116/package 118 at the delivery location 126.

FIG. 9 illustrates a flow diagram of an example process 900 of determining delivery instructions for a delivery location based on one or more images that depict the delivery location. Moreover, the following actions described with respect to FIG. 9 may be performed by the service provider 102 and/or the content server(s) 104, as illustrated with respect to FIGS. 1-7.

Block 902 illustrates receiving, from a device of a deliverer, one or more images that depict a delivery location. In some embodiments, a deliverer 106 that is to deliver an item 116/package 118 to a delivery location 126 may request delivery instructions 140, such as a request regarding a location to place the item 116/package 118, a code for a door/gate, and so on. As a result, the service provider 102 may request that the deliverer 106 capture one or more images 128 of the delivery location 126, such as by using a camera, a wearable device, a camera affixed to a delivery vehicle, and so on. Upon capturing one or more images 128, the deliverer 106 may transmit the one or more images 128 to the service provider 102.

Block 904 illustrates determining, using one or more classifiers, scene attributes of the delivery location. In various embodiments, the service provider 102 may use one or more classifiers 130 to detect and/or identify objects, features, attributes, etc. (i.e., scene attributes 132) depicted in the one or more images 128.

Block 906 illustrates estimating delivery attributes of the delivery location based on the scene attributes. Based on previously determined correlations 136 between scene attributes 132 and delivery attributes 134/delivery defects for other delivery locations 126, the service provider 102 may determine that certain scene attributes 132 are predictive or indicative of certain delivery attributes 134/delivery defects. For instance, the service provider 102 may determine that a particular scene attribute 132 is likely to be predictive or indicative of the deliverer 106 not being able to locate/access the delivery location 126, the item 116/package 118 being delivered but not received by the customer 110, and so on.

Block 908 illustrates generating one or more scores for the delivery location based on the delivery attributes. Based at least partly on the delivery attributes 134/delivery defects determined by the service provider 102, the service provider 102 may determine/generate one or more scores 138 that indicate a risk or likelihood of certain delivery defects subsequently occurring.

Block 910 illustrates determining one or more delivery instructions relating to the delivery location. In particular, based on the correlations 136 and/or the scores 138, the service provider 102 may determine one or more delivery instructions 140 that are intended to assist a deliverer 106 in delivering items 116/packages 118 at the delivery location 126.

Block 912 illustrates transmitting, to the device, the one or more delivery instructions. Upon determining the delivery instructions 140, the service provider 102 may transmit the delivery instructions 140 to a deliverer device 108 associated with the deliverer 106. As a result, the service provider 102 may provide delivery instructions 140 to the deliverer 106 in real-time, or near real-time, based on one or more images 128 that are potentially captured by the deliverer 106.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
memory; and
one or more computer-executable instructions stored in the memory and executable by the one or more processors to perform operations comprising:
receiving one or more first images that depict a first delivery location;
detecting, using one or more classifiers, one or more first scene attributes associated with the first delivery location, the one or more first scene attributes including at least one of objects or features of the delivery location that are visually depicted in the one or more first images;
determining one or more delivery attributes associated with the first delivery location, the one or more delivery attributes indicating at least one of first instances in which the first delivery location could not be located, second instances in which the first delivery location could not be accessed, or third instances in which items were delivered but not received by a customer associated with the first delivery location;
determining an average parking time and an average delivery time for one or more prior deliveries to the first delivery location;
determining a correlation between a scene attribute of the one or more first scene attributes and a delivery attribute of the one or more delivery attributes, the correlation indicating that the scene attribute is predictive of the delivery attribute;
receiving, from a deliverer device associated with a deliverer that is to deliver an item to a second delivery location that is remote from the first delivery location, one or more second images that depict the second delivery location;
determining one or more second scene attributes associated with the second delivery location, the one or more second scene attributes including the scene attribute;
determining, based at least partly on the one or more second scene attributes including the scene attribute, a risk score that represents a likelihood of an occurrence of the delivery attribute with respect to the second delivery location;
determining, based at least partly on the risk score, one or more delivery instructions for delivering the item to the second delivery location, wherein determining the one or more delivery instructions comprises:
determining an estimated parking time at the second delivery location based at least partly on the average parking time;
determining an estimated delivery time for delivering the item to the second delivery location based at least partly on the average delivery time; and
determining, based at least partly on the estimated parking time and the estimated delivery time, a delivery plan for delivering the item to the second delivery location and delivering additional items to one or more additional delivery locations on a delivery route; and
sending, to the deliverer device, the delivery plan.

2. The system as recited in claim 1, wherein the operations further comprise training the one or more classifiers by at least one of detecting, identifying, or classifying scene attributes associated with a set of images that each depict a delivery location.

3. The system as recited in claim 1, wherein the operations further comprise determining a confidence value for the scene attribute, the confidence value indicating a likelihood that the scene attribute has been correctly identified.

4. The system as recited in claim 1, wherein the delivery plan indicates a number of items to include on the delivery route in which the second delivery location is included, a number of delivery locations to include on the delivery route, and an order in which the delivery locations are to be visited.

5. A method comprising:
determining, by one or more processors of a computing device, one or more first images that depict a first delivery location;
processing, by the one or more processors of the computing device and using one or more classifiers, the one or more first images to detect one or more scene attributes that are associated with the first delivery location and that are depicted in the one or more first images;
determining, by the one or more processors of the computing device, one or more delivery attributes that relate to one or more prior deliveries of items to the first delivery location;
determining, by the one or more processors of the computing device, a first correlation between a first scene attribute of the one or more scene attributes and a first delivery attribute of the one or more delivery attributes, the first correlation indicating that a first occurrence of the first scene attribute is at least one of indicative or predictive of a second occurrence of the first delivery attribute;
determining, by the one or more processors of the computing device, a second correlation between an absence of a second scene attribute with respect to the first delivery location and a second delivery attribute of the one or more delivery attributes, the second correlation indicating that the absence of the second scene attribute is at least one of indicative or predictive of a third occurrence of the second delivery attribute;
determining, by the one or more processors of the computing device, one or more second images that depict a second delivery location that is remote from the first delivery location;

determining, by the one or more processors of the computing device and using the one or more classifiers, at least one of the presence of the first scene attribute or the absence of the second scene attribute in the one or more second images;

determining, by the one or more processors of the computing device and based at least partly on determining the at least one of the presence of the first scene attribute or the absence of the second scene attribute, a risk score that represents a likelihood of a fourth occurrence of at least one of the first delivery attribute or the second delivery attribute with respect to the second delivery location; and determining, by the one or more processors of the computing device and based at least partly on the risk score, a delivery plan for delivering an item to the second delivery location, wherein determining the delivery plan comprises:

determining at least one of:

an estimated parking time at the second delivery location based at least partly on an average parking time for one or more prior deliveries to the first delivery location; or an estimated delivery time for delivering the item to the second delivery location based at least partly on an average delivery time for the one or more prior deliveries to the first delivery location; and determining, based at least partly on at least one of the estimated parking time or the estimated delivery time, the delivery plan; and sending, by the one or more processors of the computing device and to a deliverer device associated with a deliverer that is to deliver the item to the second delivery location, the delivery plan.

6. The method as recited in claim 5, wherein:

the one or more scene attributes include at least one of a window, a door, a fence, a gate, a driveway, a vehicle, a streetlight, or foliage; and the one or more delivery attributes include at least one of a first instance in which the first delivery location could not be located, a second instance in which the first delivery location could not be accessed, a third instance in which one or more items were delivered but not received by a customer associated with the first delivery location, an average parking time, or an average delivery time.

7. The method as recited in claim 5, wherein the delivery plan indicates a number of items to include on a delivery route in which the second delivery location is included, a number of delivery locations to include on the delivery route, and an order in which the delivery locations are to be visited.

8. The method as recited in claim 5, wherein the delivery plan indicates at least one of a first instance in which the item is to be delivered, a second instance in which the item is not to be delivered, a delivery point at which the item is to be delivered, an estimated parking time, or an estimated delivery time.

9. The method as recited in claim 5, further comprising:

determining, based at least partly on the risk score, one or more delivery instructions for delivering a second item to the second delivery location; and sending, to the deliverer device, the one or more delivery instructions.

10. The method as recited in claim 5, further comprising:

receiving, from a customer device of a customer associated with the second delivery location, an order for the item; and sending, to the deliverer device, the delivery plan to facilitate delivery of the item by the deliverer to the second delivery location.

11. The method as recited in claim 5, further comprising:

determining, based at least partly on the at least one of the first correlation or the second correlation, a second risk score that represents a second likelihood of an additional occurrence of at least one of the first delivery attribute or the second delivery attribute with respect to the second delivery location; and determining the delivery plan based at least partly on the second risk score.

12. The method as recited in claim 5, further comprising:

applying the one or more classifiers to the one or more first images; and training the one or more classifiers by applying the one or more classifiers to a set of images that each depict a particular delivery location.

13. The method as recited in claim 5, wherein the delivery plan indicates at least one of an instruction to avoid the second occurrence of the first delivery attribute or to avoid the third occurrence of the second delivery attribute with respect to delivery of the item to the second delivery location.

14. A method comprising:

receiving, by one or more processors of a computing device and from a customer device associated with a customer, an order for an item for delivery to a first delivery location associated with the customer;

determining, by the one or more processors of the computing device, one or more images that depict the first delivery location;

processing, by the one or more processors of the computing device and using one or more classifiers, the one or more images to detect one or more scene attributes that are associated with the first delivery location and that are depicted in the one or more images;

determining, by the one or more processors of the computing device, a correlation between a scene attribute of the one or more scene attributes and a delivery attribute with respect to a second delivery location, the correlation indicating that a first occurrence of the scene attribute is at least one of indicative or predictive of a second occurrence of the delivery attribute;

determining, by the one or more processors of the computing device, that the second delivery location is located within a geographic area, the geographic area having a first number of occurrences of the scene attribute that is equal to or greater than a first threshold and a second number of occurrences of the delivery attribute that is equal or greater than a second threshold;

determining, by the one or more processors of the computing device, that the first delivery location is located within the geographic area;

determining, by the one or more processors of the computing device and based at least partly on the correlation and the first delivery location being within the geographic area, a likelihood of a third occurrence of the delivery attribute with respect to the first delivery location;

determining, by the one or more processors of the computing device, a risk score that indicates the likelihood of the third occurrence of the delivery attribute with respect to the first delivery location;

determining, by the one or more processors of the computing device and based at least partly on the risk score, a delivery plan for delivering an item to the first delivery location, wherein determining the delivery plan comprises:

determining at least one of:

an estimated parking time at the first delivery location based at least partly on an average parking time for one or more prior deliveries to the second delivery location; or an estimated delivery time for delivering the item to the first delivery location based at least partly on an average delivery time for the one or more prior deliveries to the second delivery location; and determining, based at least partly on at least one of the estimated parking time or the estimated delivery time, the delivery plan; and sending, by the one or more processors of the computing device and to a deliverer device associated with a deliverer that is to deliver the item to the first deliver location, the delivery plan.

15. The method as recited in claim 14, further comprising determining the delivery plan based at least partly on the correlation and the first delivery location being within the geographic area.

16. The method as recited in claim 14, further comprising:

receiving, from the deliverer device, a request for information relating to delivery of the item to the first delivery location; and sending, to the deliverer device and based at least partly on the request, instructions for the deliverer to capture the one or more images of the first delivery location.

17. The method as recited in claim 14, further comprising determining a confidence value for the scene attribute, the confidence value indicating a second likelihood that the scene attribute has been correctly identified.

18. The method as recited in claim 14, wherein the delivery plan indicates at least one of a second likelihood of the third occurrence of the delivery attribute with respect to the first delivery location or an instruction to avoid the third occurrence of the delivery attribute with respect to delivery of the item to the first delivery location.

19. The method as recited in claim 14, wherein:

the scene attribute includes at least one of a window, a door, a fence, a gate, a driveway, a vehicle, a streetlight, or foliage; and the delivery attribute includes at least one of a first instance in which the second delivery location could not be located, a second instance in which the second delivery location could not be accessed, a third instance in which one or more items were delivered but not received by a second customer associated with the second delivery location, the average parking time, or the average delivery time.

20. The method as recited in claim 14, wherein the delivery plan indicates at least one of a first instance in which the item is to be delivered, a second instance in which the item is not to be delivered, a delivery point at which the item is to be delivered, the estimated parking time, or the estimated delivery time.

* * * * *